US011574524B2

(12) United States Patent
Strause et al.

(10) Patent No.: US 11,574,524 B2
(45) Date of Patent: Feb. 7, 2023

(54) SYSTEMS AND METHODS FOR VIDEO GAME COMPETITION WAGERING

(71) Applicant: Virtual Media Group USA, LLC, Bethesda, MD (US)

(72) Inventors: Jonathan Strause, Bethesda, MD (US); Marcus Corrie, Dundee (GB)

(73) Assignee: Virtual Media Group USA, LLC, Bethesda, MD (US)

( * ) Notice: Subject to any disclaimer, the term of this patent is extended or adjusted under 35 U.S.C. 154(b) by 0 days.

(21) Appl. No.: 16/696,347

(22) Filed: Nov. 26, 2019

(65) Prior Publication Data

US 2020/0342716 A1 Oct. 29, 2020

Related U.S. Application Data

(63) Continuation of application No. 15/607,261, filed on May 26, 2017, now abandoned.

(60) Provisional application No. 62/341,837, filed on May 26, 2016.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |
| ***G07F 17/34*** | (2006.01) |

(52) U.S. Cl.

CPC ...... *G07F 17/3267* (2013.01); *G07F 17/3244* (2013.01); *G07F 17/3293* (2013.01); *G07F 17/34* (2013.01)

(58) Field of Classification Search

CPC ............................. G07F 17/32; G07F 17/3211

USPC ............................. 463/1, 13, 16, 20, 25, 39

See application file for complete search history.

(56) References Cited

U.S. PATENT DOCUMENTS

| | | | |
|---|---|---|---|
| 4,918,603 | A | 4/1990 | Hughes et al. |
| 5,570,885 | A | 11/1996 | Ornstein |
| 5,769,714 | A | 6/1998 | Wiener et al. |
| 6,007,427 | A | 12/1999 | Wiener et al. |
| 6,024,643 | A | 2/2000 | Begis |
| 6,159,095 | A | 12/2000 | Frohm et al. |

(Continued)

FOREIGN PATENT DOCUMENTS

| | | |
|---|---|---|
| EP | 0934765 A1 | 8/1999 |
| EP | 1783707 A1 | 5/2007 |

(Continued)

OTHER PUBLICATIONS

Jim Adams, letter, Feb. 4, 2005, Kennedys Patent.

(Continued)

*Primary Examiner* — Adetokunbo O Torimiro

(74) *Attorney, Agent, or Firm* — Michele V. Frank; Venable LLP

(57) ABSTRACT

Video game competition wagering in a hybrid game including a host game and a guest game is disclosed. A wager associated with a player in the host game is received. An outcome of at least one gambling event in the host game is determined. Game elements are associated with the player based at least in part on the gambling event outcome. The game elements may affect the player's interaction in a round of play of the guest game. A gaming outcome is determined based on the player's interaction with the round of play in the guest game.

33 Claims, 12 Drawing Sheets

(56) References Cited

U.S. PATENT DOCUMENTS 6,165,070 A 12/2000 Nolte et al.
6,292,706 B1 9/2001 Birch et al.
6,325,721 B1 12/2001 Miyamoto et al.
6,358,150 B1 3/2002 Mir et al.
6,371,855 B1 4/2002 Gavriloff
6,524,184 B1 2/2003 Lind et al.
6,616,529 B1 9/2003 Qian et al.
6,848,991 B2 2/2005 Kusuda
6,860,806 B2 3/2005 Kojima et al.
6,921,331 B2 7/2005 Gatto et al.
6,935,946 B2 8/2005 Yoseloff et al.
7,548,242 B1 6/2009 Hughes et al.
7,874,919 B2 1/2011 Paulsen et al.
7,922,575 B2 4/2011 Jankowski
7,927,204 B2 4/2011 DeBrabander, Jr. et al.
8,192,270 B2 6/2012 Slomiany et al.
8,337,309 B2 12/2012 Okuniewicz
8,360,835 B2 1/2013 Strause et al.
8,414,387 B1 4/2013 Paradise et al.
8,475,266 B2 7/2013 Arnone et al.
8,485,877 B2 7/2013 Saks
8,562,445 B2 10/2013 Arnone et al.
8,602,881 B2 12/2013 Arnone et al.
8,632,395 B2 1/2014 Arnone et al.
8,636,577 B2 1/2014 Arnone et al.
8,636,589 B2 1/2014 Harris et al.
8,657,660 B2 2/2014 Arnone et al.
8,657,675 B1 2/2014 Meyerhofer et al.
8,663,012 B2 3/2014 Weingardt
8,668,581 B2 3/2014 Arnone et al.
8,672,748 B2 3/2014 Arnone et al.
8,684,813 B2 4/2014 Arnone et al.
8,684,829 B2 4/2014 Arnone et al.
8,708,808 B2 4/2014 Arnone et al.
8,715,068 B2 5/2014 Arnone et al.
8,715,069 B2 5/2014 Arnone et al.
8,734,230 B2 5/2014 Yoseloff
8,734,238 B2 5/2014 Arnone et al.
8,740,690 B2 6/2014 Arnone et al.
8,753,212 B2 6/2014 Arnone et al.
8,758,122 B2 6/2014 Arnone et al.
8,790,170 B2 7/2014 Arnone et al.
8,808,086 B2 8/2014 Arnone et al.
8,821,264 B2 9/2014 Arnone et al.
8,821,270 B2 9/2014 Arnone et al.
8,834,263 B2 9/2014 Arnone et al.
8,845,408 B2 9/2014 Arnone et al.
8,845,419 B2 9/2014 Meyerhofer et al.
8,845,420 B2 9/2014 Arnone et al.
8,851,967 B2 10/2014 Arnone et al.
8,882,586 B2 11/2014 Arnone et al.
8,905,840 B2 12/2014 Arnone et al.
8,936,511 B2 1/2015 Levy
8,944,899 B2 2/2015 Arnone et al.
8,951,109 B2 2/2015 Arnone et al.
8,951,113 B2 2/2015 Arnone et al.
8,968,079 B2 3/2015 Kennedy
8,974,294 B2 3/2015 Arnone et al.
8,986,097 B2 3/2015 Arnone et al.
8,986,105 B2 3/2015 Okuniewicz
8,986,110 B2 3/2015 Arnone et al.
8,986,117 B2 3/2015 Arnone et al.
8,998,707 B2 4/2015 Arnone et al.
9,005,008 B2 4/2015 Arnone et al.
9,039,521 B2 5/2015 Arnone et al.
9,039,536 B2 5/2015 Arnone et al.
9,047,735 B2 6/2015 Arnone et al.
9,058,723 B2 6/2015 Arnone et al.
9,092,933 B2 7/2015 Arnone et al.
9,135,776 B2 9/2015 Arnone et al.
9,177,435 B2 11/2015 Arnone et al.
9,218,714 B2 12/2015 Arnone et al.
9,230,404 B2 1/2016 Arnone et al.
9,251,657 B2 2/2016 Arnone et al.
9,302,175 B2 4/2016 Arnone et al.
9,305,420 B2 4/2016 Arnone et al.
9,330,533 B2 5/2016 Arnone et al.
9,336,656 B2 5/2016 Arnone et al.
9,349,247 B2 5/2016 Arnone et al.
9,349,249 B2 5/2016 Arnone et al.
9,355,529 B2 5/2016 Arnone et al.
9,361,758 B2 6/2016 Arnone et al.
9,373,223 B1 6/2016 Webb
9,384,623 B2 7/2016 Arnone et al.
9,384,630 B2 7/2016 Arnone et al.
9,384,631 B2 7/2016 Arnone et al.
9,430,902 B2 8/2016 Arnone et al.
9,443,387 B2 9/2016 Arnone et al.
9,449,460 B2 9/2016 Arnone et al.
9,449,466 B2 9/2016 Arnone et al.
D769,871 S 10/2016 Meyerhofer
9,466,175 B2 10/2016 Arnone
9,472,055 B2 10/2016 Arnone et al.
9,478,096 B2 10/2016 Arnone et al.
9,478,103 B2 10/2016 Arnone et al.
9,483,165 B2 11/2016 Arnone et al.
9,489,797 B2 11/2016 Arnone et al.
9,489,802 B2 11/2016 Arnone et al.
9,495,837 B2 11/2016 Arnone et al.
9,508,216 B2 11/2016 Arnone et al.
D773,531 S 12/2016 Toth et al.
9,530,275 B2 12/2016 Arnone et al.
9,530,282 B2 12/2016 Graboyes Goldman et al.
D776,150 S 1/2017 Paulik
D777,194 S 1/2017 Sellers et al.
9,536,375 B2 1/2017 Arnone et al.
9,536,383 B2 1/2017 Arnone et al.
9,536,386 B2 1/2017 Arnone et al.
9,558,624 B2 1/2017 Arnone et al.
D779,544 S 2/2017 Paulik
9,564,008 B2 2/2017 Arnone et al.
9,564,015 B2 2/2017 Arnone et al.
9,569,929 B2 2/2017 Arnone et al.
9,576,424 B2 2/2017 Arnone et al.
9,576,427 B2 2/2017 Arnone et al.
D780,747 S 3/2017 Sharp et al.
D780,773 S 3/2017 Sharp et al.
D780,786 S 3/2017 Toth et al.
D780,852 S 3/2017 Sharp et al.
D781,340 S 3/2017 Toth et al.
9,589,421 B2 3/2017 Arnone et al.
9,595,170 B2 3/2017 Arnone et al.
9,600,960 B2 3/2017 Arnone et al.
9,607,480 B2 3/2017 Arnone et al.
9,626,836 B2 4/2017 Arnone et al.
9,640,032 B2 5/2017 Arnone et al.
9,659,438 B2 5/2017 Arnone et al.
2002/0065566 A1 5/2002 Aronson et al.
2002/0082077 A1 6/2002 Johnson et al.
2002/0132660 A1 9/2002 Taylor
2003/0064807 A1 4/2003 Walker et al.
2003/0078087 A1 4/2003 Kojima et al.
2004/0053686 A1 3/2004 Pacey et al.
2005/0044575 A1 2/2005 Der Kuyl
2005/0148388 A1 7/2005 Vayra et al.
2005/0261043 A1 11/2005 Slade
2006/0046807 A1 3/2006 Sanchez
2006/0183547 A1 8/2006 McMonigle
2007/0015584 A1* 1/2007 Frenkel ............... G07F 17/3272
463/42
2007/0060380 A1 3/2007 McMonigle et al.
2007/0077994 A1 4/2007 Betteridge
2007/0087804 A1 4/2007 Knowles et al.
2007/0087825 A1 4/2007 Hart et al.
2007/0244878 A1 10/2007 Hulme et al.
2007/0265092 A1 11/2007 Betteridge
2007/0293289 A1 12/2007 Loeb
2008/0033734 A1 2/2008 Carry
2008/0064488 A1 3/2008 Oh
2008/0081689 A1 4/2008 Seelig et al.
2011/0009178 A1 1/2011 Gerson
2011/0212766 A1 9/2011 Bowers et al.
2011/0218035 A1 9/2011 Thomas

(56) References Cited

U.S. PATENT DOCUMENTS

| | | | | |
|---|---|---|---|---|
| 2012/0094737 | A1* | 4/2012 | Barclay | G07F 17/34 463/20 |
| 2013/0131848 | A1 | 5/2013 | Arnone et al. | |
| 2013/0178259 | A1 | 7/2013 | Strause et al. | |
| 2013/0237326 | A1 | 9/2013 | Arnone et al. | |
| 2013/0252718 | A1 | 9/2013 | Arnone et al. | |
| 2013/0281171 | A1 | 10/2013 | Ramsour et al. | |
| 2014/0025732 | A1 | 1/2014 | Lin et al. | |
| 2014/0073405 | A1 | 3/2014 | Arnone et al. | |
| 2014/0087808 | A1 | 3/2014 | Basallo et al. | |
| 2014/0141863 | A1 | 5/2014 | Arnone et al. | |
| 2014/0221065 | A1 | 8/2014 | Strause et al. | |
| 2014/0228083 | A1 | 8/2014 | Arnone et al. | |
| 2014/0378219 | A1 | 12/2014 | Arnone et al. | |
| 2015/0080074 | A1 | 3/2015 | Arnone et al. | |
| 2015/0087406 | A1 | 3/2015 | Denham et al. | |
| 2015/0111632 | A1 | 4/2015 | Meyer | |
| 2015/0119127 | A1* | 4/2015 | Arnone | G07F 17/326 463/17 |
| 2015/0187172 | A1 | 7/2015 | Landen | |
| 2016/0012682 | A1 | 1/2016 | Strause et al. | |
| 2016/0110965 | A1 | 4/2016 | Arnone et al. | |
| 2016/0180647 | A1 | 6/2016 | Webb | |
| 2016/0343211 | A1 | 11/2016 | Graboyes Goldman et al. | |
| 2017/0011598 | A1 | 1/2017 | Strause et al. | |

FOREIGN PATENT DOCUMENTS

| | | | |
|---|---|---|---|
| WO | 01/41447 | A1 | 6/2001 |
| WO | 01/59680 | A1 | 8/2001 |
| WO | 03/011411 | A1 | 2/2003 |
| WO | 2005/009566 | A2 | 2/2005 |
| WO | 2005/069182 | A1 | 7/2005 |

OTHER PUBLICATIONS

"Cashplay takes e-sports to mobile with realmoney cash tournaments" http://venturebeat.com/2015/01/13/cashplay-takes-e-sports-to-mobile-with-real-money-cash-tournaments/.
"New peer-to-peer video game wagering site goes live" https://www.vg247.com/2015/12/16/sign-up-opens-for-new-peer-to-peer-video-game-wagering-site/.
"Esports" http://opshead.com/article/670/esports-betting-gambling-on-professional-gamings-future.
Nayak "Exclusive: Glu Mobile dips toe in U.S. real-money games".
"Peer to Peer Esports Wagering Site gaimerz.com Launches" http://calvinayre.com/2015/12/22/press-releases/peer-to-peer-esports-wagering-site-gaimerz-com-launches/.
Wylie "Virgin gambles on video-game betting; Based in Toronto. Players challenge others with equal skills".
"Why Investors Are Gambling On Betable Even Though It's Illegal In The U.S." http://www.fastcompany.com/1842340/why-investors-are-gambling-betable-even-though-its-illegal-us.
Gamasutra "The man behind XBLA places bet on skill-based, real-money gaming on mobile" http://www.gamasutra.com/view/news/274587/The_man_behind_XBLA_places_bet_on_skillbased_realmoney_gaming_on_mobile.php.
"Skillz" http://corp.skillz.com/press/.
"Alex Igelman, ""eSports: A Safe Bet for Operators?"" http://www.gamingresearchpartners.com/wp-content/uploads/2016/05/Whitepaper-final-2.pdf."
PCT/US2016/032742 International Search Report and Written Opinion dated Jul. 27, 2016.

* cited by examiner

600

800

900

SYSTEMS AND METHODS FOR VIDEO GAME COMPETITION WAGERING

CROSS REFERENCE TO RELATED APPLICATION

This application is a continuation of U.S. patent application Ser. No. 15/607,261, filed May 26, 2017 which claims priority to U.S. Provisional Application No. 62/341,837, entitled "SYSTEMS AND METHODS FOR VIDEO GAME COMPETITION WAGERING," filed on May 26, 2016, the disclosure of which is incorporated by reference herein in its entirety.

TECHNICAL FIELD

The present invention relates to systems, methods, and computer program products used in providing competitive wagering on video games, such as multi-player video games.

BACKGROUND

In the casino gaming market, traditional slot machines are becoming less appealing to a new generation of consumers, who seek a more interactive, skill-based gaming experience. Virtual events have been used for gambling in casinos either via slot machines, kiosk terminal wagering, or at a track betting shop. They can be also found online in abundance. Traditionally, these virtual events are wholly non-interactive events. Individuals bet on virtual events by placing money directly into a slot machine, or as they would bet at a real life horse race where an individual walks up to a window and places a bet with a person or on a betting terminal. A random number generator determines either the outcome of a race, fight (or event subcomponent such as round of a fight, a quarter of a race, a period of a game), etc. For example in a horse race, a random number generator will determine the outcome based on either randomly selecting equally weighted horses (all have equal chance of winning) or randomly selecting probability weighted horses (where they have a probabilistic chance of winning).

In gaming (casino, horse betting, sports betting, etc.) virtual events are used for gambling either via a slot machine (kiosk or terminal wagering), or a monitor (simulcast TV screens at track or a betting shop). In a computer controlled simulation game, the combination of either play-by-play, punch-by-punch, or step-by-step complex algorithms, optimization models, decision trees, and probabilistic dice rolls are all utilized to determine how one competitor (or team) will behave and then independently how the different competitors or teams will respond.

The video game market is awash with multi-player interactive games ideally suited to quick competitive matches between individual or teams of players lasting short periods of time. Video games may be used in eSports. Typically, eSports involves teams of real players participating in a computer generated game by using interactive joysticks, and controllers, pads, etc. Games such as first person shooters ("FPS"), card games, fighting games and/or horse racing, all provide fast competitive matches with players competing as individuals or on teams to achieve some goal and to win the competition.

By contrast in eSports video games the in-game competitors are generally under player control, although "Bots" can be controlled by the simulation system when required. Wagering can be taken on eSports in the same way as virtual sports as eSports events. These events occur in an "environment" that has goals (scoring a touchdown, knocking out an opponent, winning a race), that has rules (where a competitor can hit, how much weight a horse must carry, etc.), constraints (the environmental constraints of a track, the physical constraints of not being able to run "through" other competitors), and the effects of other competitors (another player tackling you or forcing a fumble, another horse being in front of you and impeding your progress, being hit or bumped during a fight, game, or race, etc.). The outcome of a match depends on the actual completion of the event by the player competitors, and the outcome is determined once one or more competitors have successfully completed the event.

A multi-player video game may typically be structured in two parts: a server part which allows multiplayer play and a client part which allows individual player interaction with the game. A platform providing competitive wagering on video games would be desirable.

SUMMARY

Disclosed are systems, methods, and computer program products used in providing competitive gaming (e.g., for real money) on video game products (hereinafter referred to as guest games), such as multi-player video games. A video game may include any type of game that utilizes computing functionality. In various embodiments, a guest game product may include an independently produced game which is integrated with a host system designed to allow gambling modality play with real money, points, and/or currency wagered on a player's performance and their outcome in the guest game. A gambling style game that controls and/or interfaces with the guest games may include a host game. The host game provides a game flow designed to create a method of play akin to player wagering and competing in a gambling style game, such as poker game, roulette game, slots game, dice game, Keno-based game, card-based gambling game, and/or any other gambling modality. The host game may be combined with interactive play rounds created using an existing multi-player video game.

Various embodiments may integrate poker-based, roulette-based, slot-based, dice-based, playing card-based, Keno-based, and/or other traditional gambling game style game behavior on top of existing multi-player guest games. The players may wager on their own abilities, either individually or in teams, on game matches in a series of rounds each punctuated by skill-based strategic decisions. Matches can be simultaneously broadcast by video and watched by $3^{rd}$ parties who are not directly involved in the game.

Embodiments may include a poker-style or traditional skill-based game that utilizes existing multi-player games and integrates managed play in an over-arching host system. The present invention can also be used as passive content delivery for wagering simultaneously with poker-style sit and play gaming.

Embodiments may not necessarily depend on creation of a single bespoke game, and may instead allow a variety of multi-player games to be used.

It is the object of the present invention to provide a system that allows multi-player games to be integrated into a host game system, such that the host game play and personal wager mechanics can be applied equally to a plethora of multi-player games. The systems disclosed herein may, for example, include a computer environment host onto which guest games are installed, Application Programming Interface (API), and/or a Software Development Kit (SDK) with access to a game database, betting system, regulation system, administration system, and/or other components. The system may be deployed on local private networks or used on wider distributed networks such as the internet on all manner of connected devices.

The host game may include an accounting system for player registration and management, a terminal system running an environment to which players can login to access their accounts and games, and a backend management system and software responsible for scheduling, monitoring and reporting player matches. The management system also performs the task of player match-up so that players are evenly matched in their games, data and game analysis, and/or configuration of games. The terminal system software embodiment may be installed on a variety of hardware. The terminal system software forms the host game operating system environment, on to which multi-player games are installed and integrated as guest games.

An embodiment of the present invention allows a player to login or connect to a host environment and select games to play in competition with other players or in single player form against the house. The system may use algorithms to select players according to their ranking and performance parameters for any of the multi-player games supported and may present available matches for them to join consisting of similar ranked players. Players then proceed to start the host game and play through a series of competitive rounds with the outcomes decided in the guest game. Each round in the guest game may be interspersed with host game activities, which allow the player to create opportunity and advantage for themselves in the guest game and to wager on the final outcome of the game. The player may pay fees into a pot in the hope of winning a portion of the pot at the end of the game. This process may continue until the whole game completes, and the winners are decided. Players are then credited with their winnings, and can join a new game.

Histories of game matches may be maintained and stored in addition to actual performance data of competitors that participated in the games. These histories may include all relevant data about a competitor and the past events the competitor competed in, and can be accessed prior to a match beginning. This information may be summarized and may be made available to other competitors in the games. The match may be broadcast or simulcast in real-time through-out the real-world using existing and conventional video transport media, such as web, TV, satellite, telephone network, and cable.

Individuals throughout the real-world may watch the match unfold in real-time. The match may be any type of video game, eSport, multi-player video game, or skill-based game that is usually between competitors. Such games may include but are not limited to first person shooters, fighting games, sports games, racing games, multiplayer online battle arena games, real time strategy games, role playing games, casual games (like match-3, platform, etc.), conventional and unconventional card games, and/or other skill-based games. Prior to the broadcast of special high profile matches, promotion of the event may be made similar to a real-world event (e.g., similar to a promotion of a heavyweight boxing fight in Las Vegas). Promotional activities can include TV advertising, pamphlets, posters, mailers, magazine and paper articles, presentations, web-verts, emails to subscribing customers and other forms of marketing.

The present invention provides a process of analyzing and integrating new guest games. The method allows metrics to be collected on game elements. Game elements may include any attribute of game including, but not limited to, game items, game environments, characters, teams in game, gameplay configurations, and/or other attributes. Game elements may include game items. Game items may include anything that impacts a player's performance or can be utilized by a player in a guest game to enhance or diminish their ability to succeed when combined with their skill. Examples of game items include weapons, attributes, skills, magic, collectible items, power-ups, equipment, buffs, and the like. Game item benefits and the game items may be scored appropriately to create symmetric and balanced game behavior. The analysis toolkit is designed to be configured for all manner of multi-player video games. It is possible for the system to perform statistical analysis of games as they are played to ensure the expected benefit patterns for game elements (e.g., game items) are correct and the game is well balanced.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

DETAILED DESCRIPTION

Introductory Remarks

The following detailed description of some embodiments of the current invention includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Figure 1:
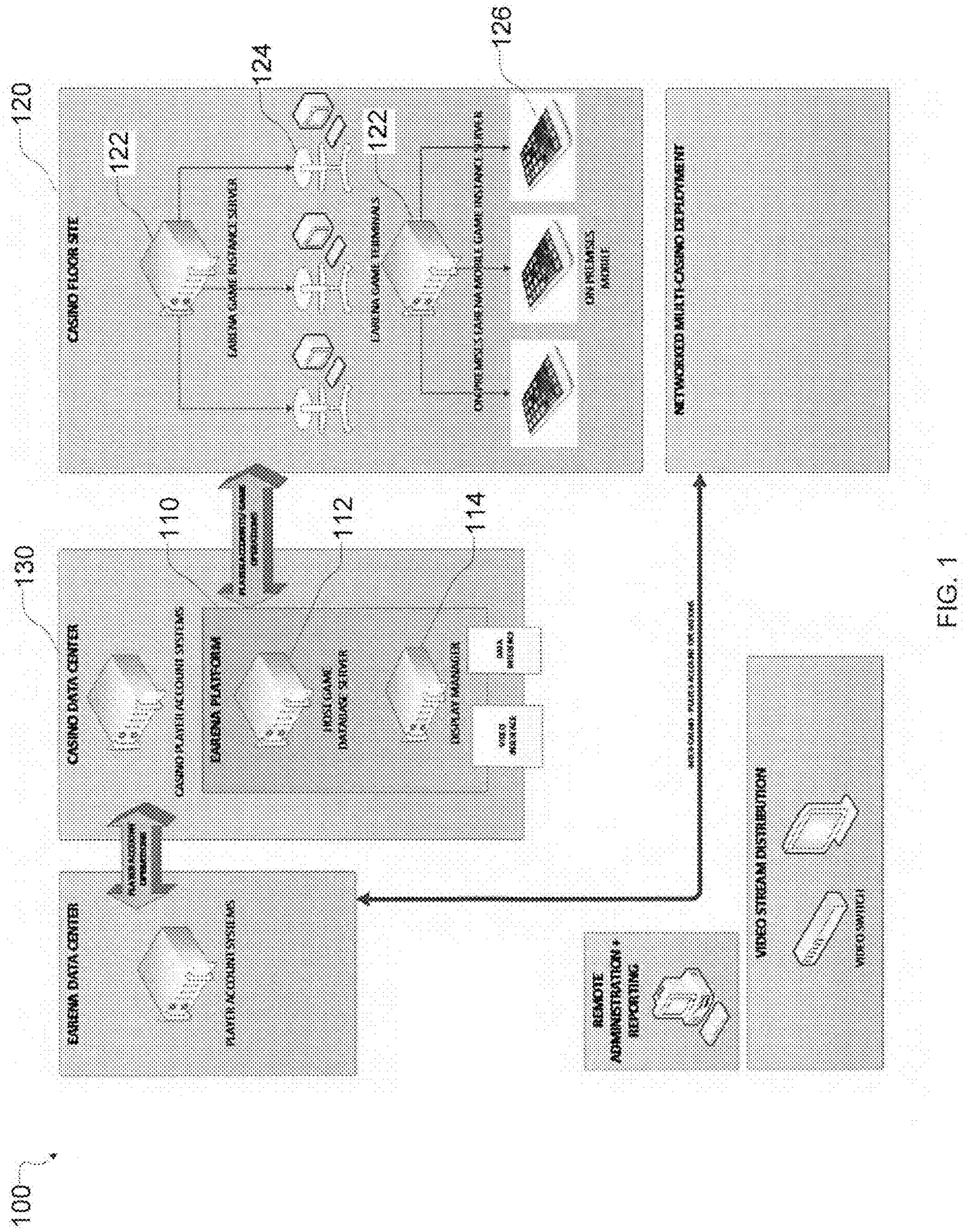
FIG. 1 is a block diagram illustrating embodiments of a system for video game competition wagering.

FIG. 1 is a block diagram illustrating embodiments of a system for video game competition wagering. In the example shown, a system 100 for terminal and mobile gaming within a single casino environment is depicted. The system 100 may include host game platform 110, casino floor site 120, and other elements. The host game platform 110 may include host game database server 112, display manager 114, and other elements. The display manager 114 allows data from the host game database 112 to be distributed for general viewing, or access for 3$^{rd}$ party systems. A video broadcast feed comes from the host environment on the floor of the casino, where the video from each guest game instance server 122 can be broadcast to monitors around the casino. Players may interact with the hybrid game via game terminals 124, mobile devices 126, and/or other suitable interfaces.

In some embodiments, players may have access to the host game environment via a devices such as terminals 124, mobile devices 126, computers, and/or custom devices. Each player may have an account under the host game environment into which they may pay real money or a virtual currency to use to enter and play matches, and a player identity may be provided from an external 3$^{rd}$ party. An account uniquely identifies a player, and records the player performance histories, rank, money histories, rating, contact details, reward card information, and/or any other pertinent information about the player. The account may record this information on a per guest game type basis, and amalgamate the information into a player profile.

According to various embodiments, a casino host environment may be installed on a device. The host environment may include a software program which prevents access to all other operating system actions, other than those concerned with game play and account. The player may log onto the host environment via the terminal. The host environment may be a touch screen device, a mobile device, a tablet device, an embedded device, and/or embedded in an existing device. The player may be identified by any number of standard methods, including, but not limited to a casino reward card, a user/password combination, or a voucher card purchased at a cash desk for temporary play. The host environment software communicates with the host game environment database server to obtain player account information, and to control game flow and maintain game records. Each game may be simultaneously broadcast via video.

The game server instance 122 may run the games that form an integral part of the overall host game. These games may include a variety of games including fighting game, a racing game, a card game, first person shooter game, and/or any other video game.

When a player logs into an embodiment of a host game system, their login details are validated against the stored details and access to their account may be granted or denied depending on the status of the player. The status of the player can be automatically determined by the system, or it can be set by an administrator.

The information may be transferred from the host game system to the host environment from which the player accessed the system. The player may be able to access any of the guest games on the system, whether they have played them before or not. If they are new to the guest game on the system they may be required to play qualifier games only. Qualifier games are free to play and provide a way of assessing player ability to match up with other players in for-money games.

Example of Casino Interconnection

In jurisdictions where there are multiple casinos and players can access an embodiment that is within a networked casino deployment, players can be identified on the system wherever they visit. This may be achieved by connecting casino account systems with a central player account system. A player may log into the local casino account with their individual identity and may then be connected to the platform player account system.

Figure 2:
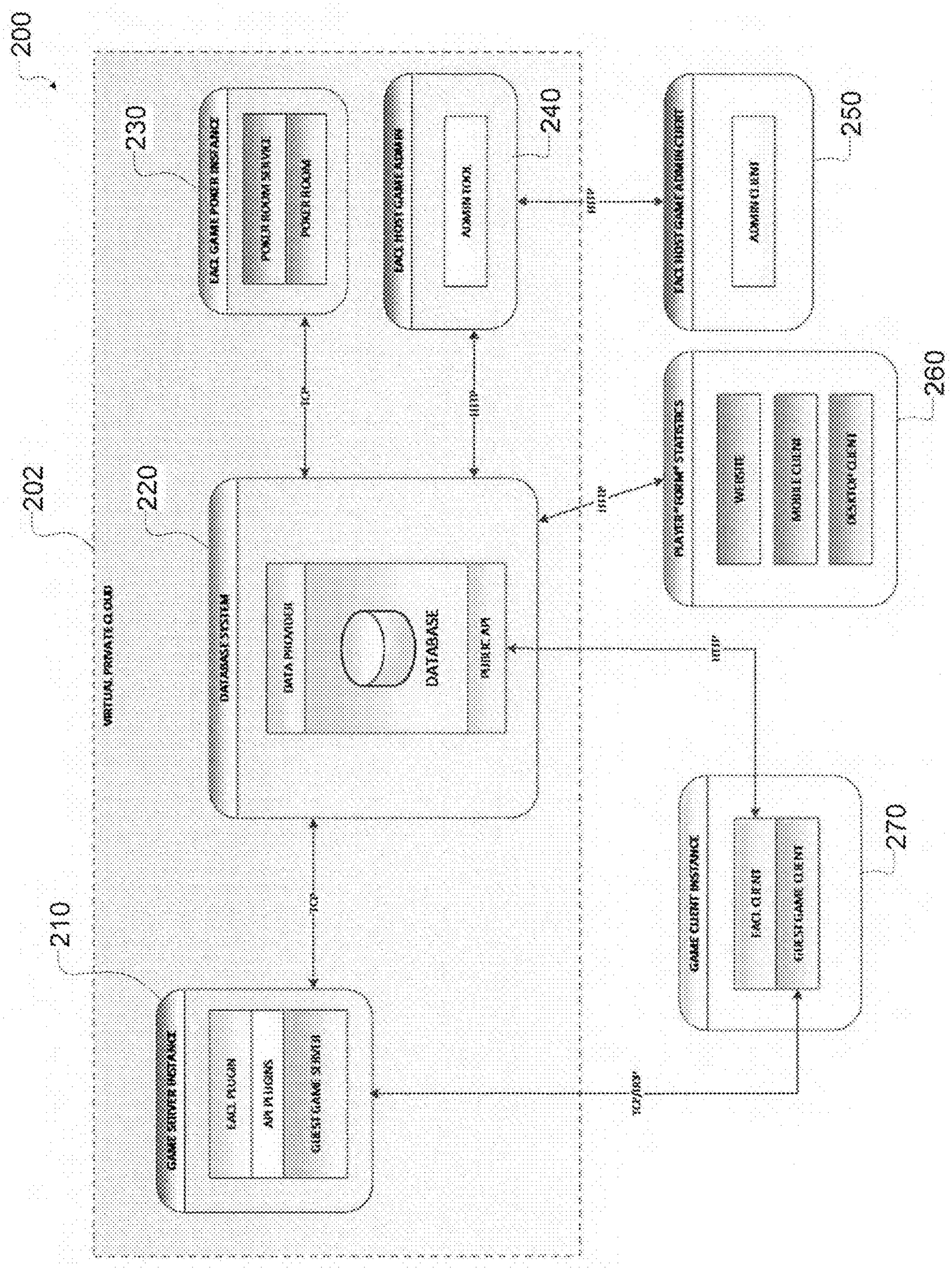
FIG. 2 is a block diagram illustrating embodiments of a system architecture for video game competition wagering.

FIG. 2 is a block diagram illustrating embodiments of a system architecture for video game competition wagering. In the example show, a system 200 for video game competition wagering may include various components including a game server instance 210, database system 220, host game instance 230, host game administration engine 240, a host game administration client 250, player statistics engine 260, a game client instance 270, and/or other elements. The components may communicate via Transmission Control Protocol (TCP), Transmission Control Protocol/User Datagram Protocol (TCP/UDP), Hypertext Transfer Protocol (HTTP), and other suitable protocols. Various components may be included in a virtual private cloud environment 202. A game server instance 210 may include a server that hosts a guest game. The game server instance 210 may include various plug-ins to allow the guest game interface with a host game. A database system 220 may coordinate gameplay by interfacing with the guest game server 210, host game instance 230, host game administration module 240, the guest game client instance 270, and/or other elements. The host game instance 230 may include an instance of a gambling modality game, such as poker, roulette, slots, dice based game, Keno, and the like. The host game administration engine 240 may interface with the host game administration client 250 to control administrative functions of gameplay. The administration functions may include:

- Account management and access control, e.g.:
  - Player account register, suspend, ban, delete, notify, etc.
- Game Setup and Management, e.g.:
  - Create, delete games
  - Suspend, cancel running games
  - Monitor games in progress for which specialised tools may be used for example
- Game Integration and Balancing, e.g.:
  - Game item configuration per round
  - Fee configuration per round
  - Number rounds
- Player Balancing, e.g.:
  - Player group/rank management
- Account Reporting, e.g.:
  - Real-time amounts
  - Amount per game
  - Amount per player
  - Amount per team
  - Total spends for time period
  - Total earns for time period A player statistics display component 260 may display statistics associated with a player that are stored in the system 220, e.g., wins, losses, skill level, number of games played, and/or any other type of statistics. A game client instance 270 may include an instance of a hybrid game including a host game and a guest game as described herein.

Figure 3:
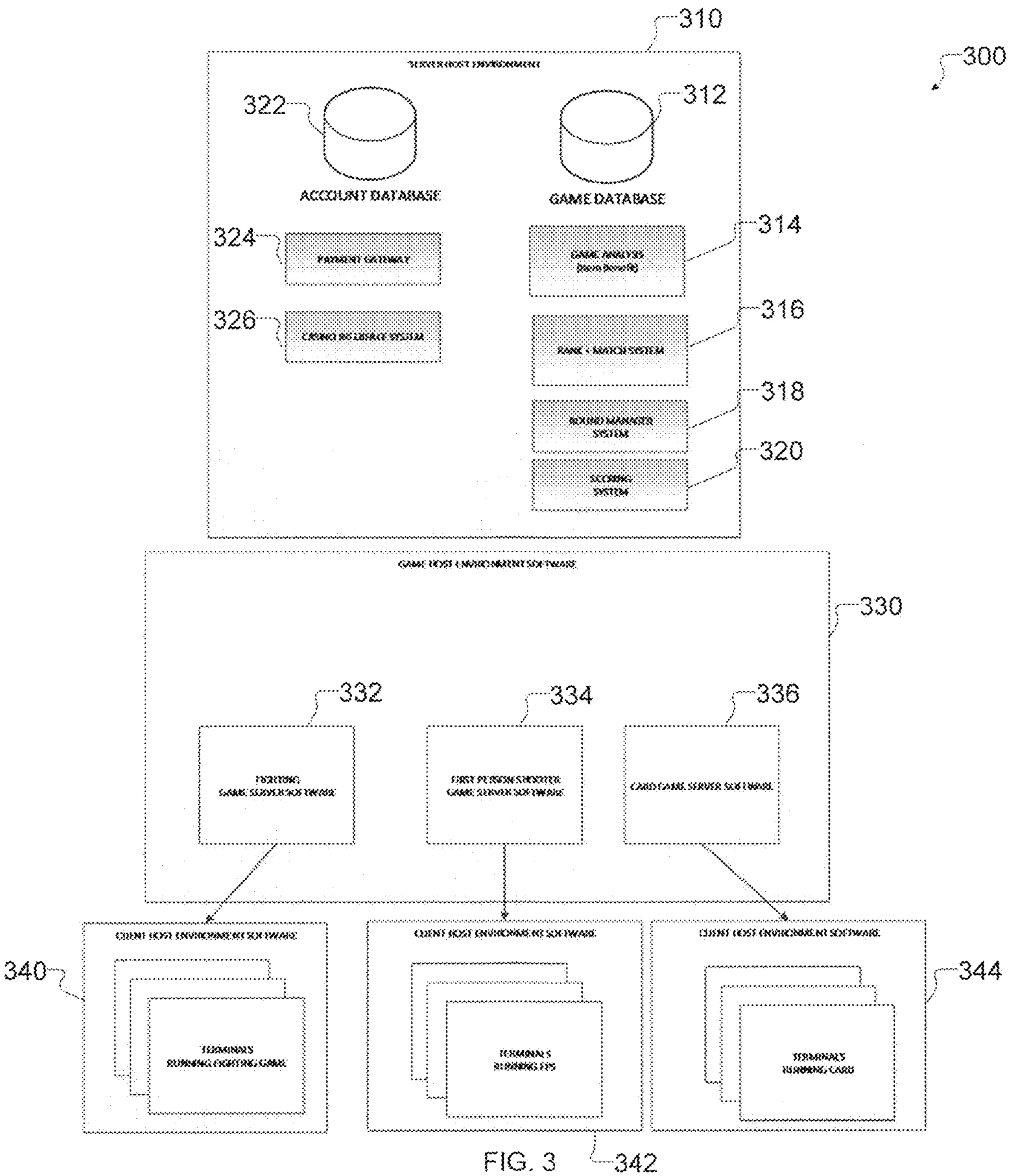
FIG. 3 is a block diagram illustrating embodiments of software subsystems within host and client architecture.

FIG. 3 is a block diagram illustrating embodiments of software subsystems within host and client architecture. In the example shown, a server host environment 310 includes a game database 312, game analysis tools 314, ranking and matching engine 316, round manager system 318, scoring system 320, and other elements that govern gameplay. The game database 312 stores guest games, host games, and other game related data. The game analysis tools 314 may be used to analyze the elements of a guest game to identify and score game items. The rank and match system 316 may govern player rank and may generate matches between various players based on their ranking and/or other statistics. The round manager 318 configures rounds of gameplay in the hybrid game. The scoring system 320 controls scoring in a round of gameplay in the hybrid game, and the final scoring of the game.

The server host environment may also include an account database 322, payment gateway 324, casino interface system 326, and/or other elements. The account database 322 may store account information for a plurality of players registered with the platform. The account information may include the identity of the players, money in a player's account, bank information, the player's gameplay history, and/or other information. The payment gateway 324 may govern payment to various players on the platform and may also govern receipt of funds from the players. The casino interface system 326 may interface with a casino data center (e.g., casino data center 130 of FIG. 1), through which casino player account information may be connected to the system.

In various embodiments, game host environment software 330 may include various hybrid games, such as fighting game software 332, first person shooter game software 334, card game server software 336, and/or any other type of multi-player video game software. The host game environment software may include hybrid games software including a host game (e.g., a gambling modality) and a guest game (e.g., fighting game, first person shooter, card game, and/or any video game). The host game environment 330 may communicate with various clients to provide the hybrid game software. For example, fighting game server software 332 may be provided to terminals, mobile device, and/or other client devices running the fighting game software 340. Similar arrangements may be configured for terminals running first person shooters 342, card games 344, and/or any other type of hybrid games.

Figure 4:
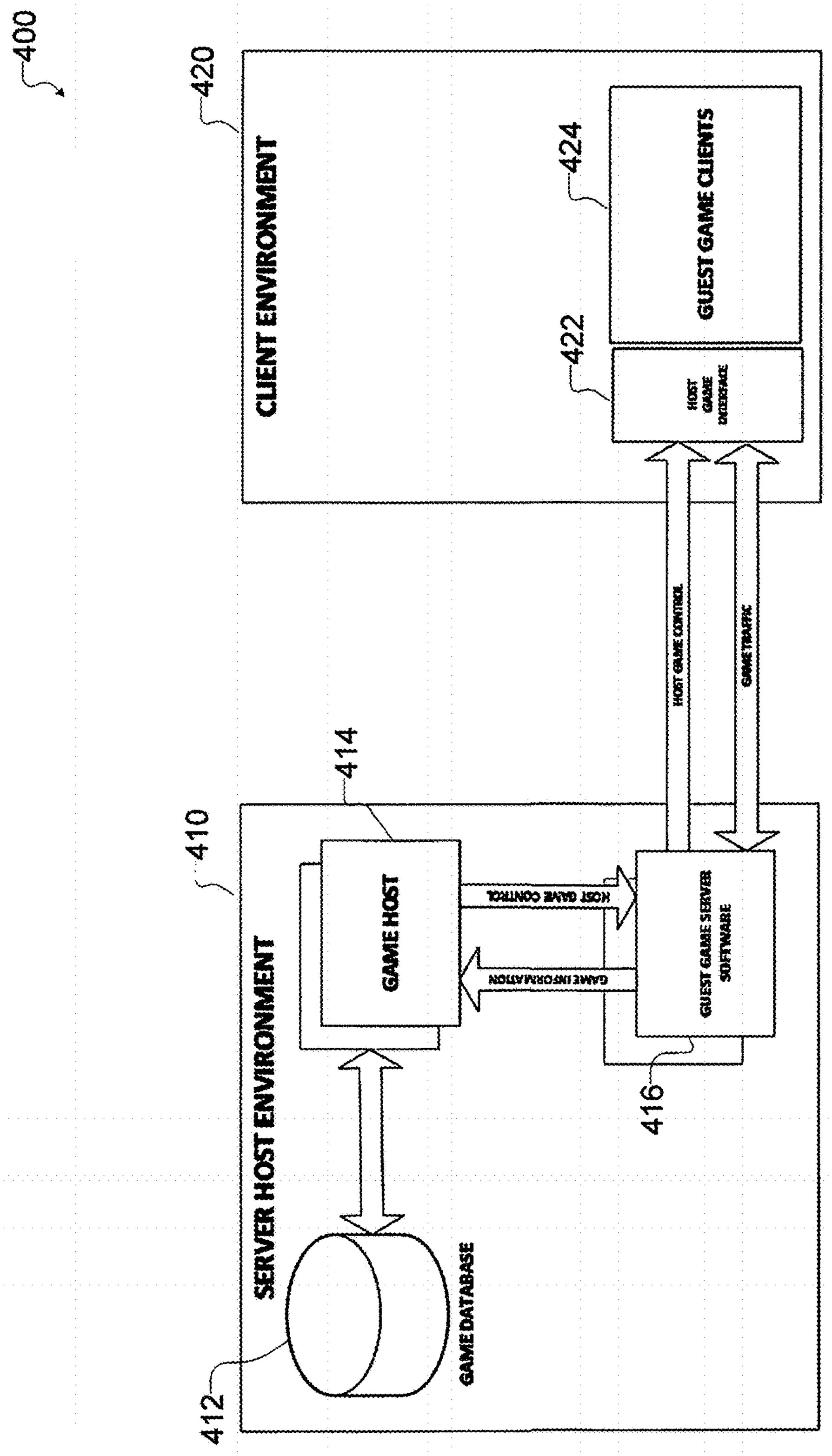
FIG. 4 is a block diagram illustrating embodiments of a software structure for a game and information and control flows.

FIG. 4 is a block diagram illustrating embodiments of a software structure for a game and information and control flows. In the example shown, a hybrid game environment 400 includes a server host environment 410, a client environment 420, and/or other components. The server host environment 410 includes a game database 412 storing various guest games (e.g., fighting games, first person shooters, card games, and/or any video game). A game host 414 may interface with the game database 412 to control aspects of a guest game. A host game may, for example, control allocation of game elements to players based on gambling event outcomes, as discussed herein. The game host 414 may control aspects of the guest game including aspects of the gameplay, controlling game items, configuring rounds of play, and/or otherwise controlling the guest game. The game host 414 may control the guest game server software 416.

In client environment 420 associated with a gaming terminal, mobile device, tablet, desktop computer, and/or other device presents the host game interface 422 to a player of the hybrid game. The host game interface 422 may include the interface of the hybrid game. The hybrid game may include a host game (such as a poker-style game, roulette-style game, slot-style game, Keno-style game, and/or other type of gambling modality) and a guest game (such as a multiplayer video game). The host game interface 422 may control the guest game client 424 by providing the player with the game items based on the gambling outcome, configuring gameplay by setting up a round of play, and/or otherwise controlling the guest game client 424.

Figure 5:
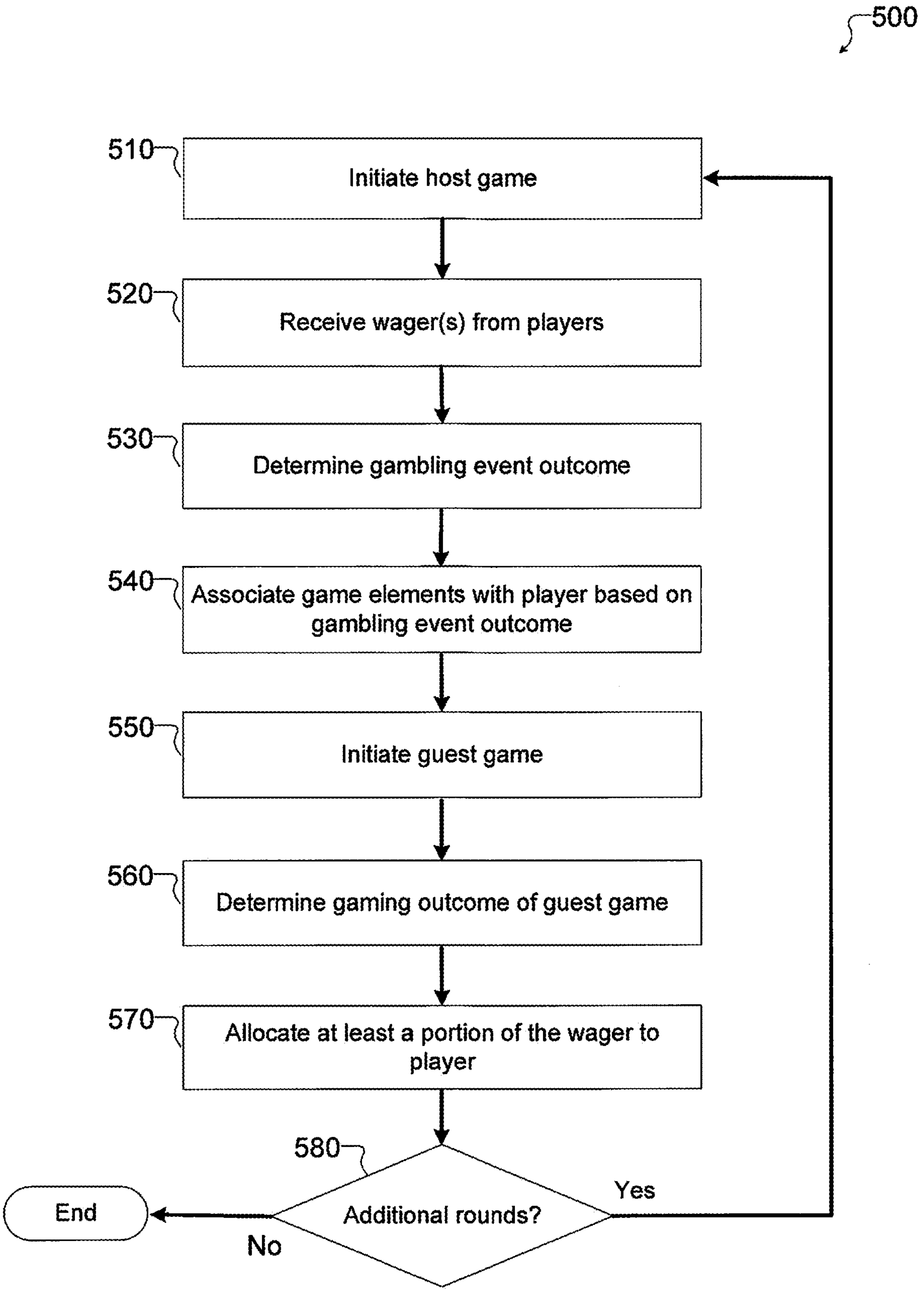
FIG. 5 is a flow chart illustrating embodiments of a process for video game competition wagering.

FIG. 5 is a flow chart illustrating embodiments of a process for video game competition wagering. In the example shown, a process 500 may be performed for one or more rounds of hybrid game play. As discussed herein, a hybrid game includes a host game and a guest game. A round of play, in various embodiments, can include host game play and guest game play. The outcome of the host game play may impact the game elements of the guest game.

At 510, a host game is initiated. A round of play may be initiated by presenting the host game interface to one or more players of the game. In one example, the host game includes a Texas Hold 'Em poker-style game where players are dealt cards in multiple rounds and place wagers prior to and/or after being dealt a hand. In other example, the host game interface may include a roulette-style game where the player spins the wheel, a slot-based interface where the play pulls the slot handle, and/or any other gambling interface.

At 520, wagers are received from players. The wager may be received in a host game interface. A wager in one aspect can include a value that is risked on an uncertain event, such as, the uncertain outcome of the guest game. The wager may include actual currency, virtual currency, casino currency, points, and/or and the like. Depending on the type of host game gambling modality, the wager may be placed into a pot (e.g., in a poker-style game) and/or otherwise held by the host game depending on the outcome of one or more rounds of play.

At 530, a gambling event outcome is determined. A gambling event may include a result of gambling-related action in the host game. For example, a gambling event may include cards dealt in a poker-style game, a spin of the wheel in a roulette-style game, a pull of the handle in slot-style game, a roll of the dice, numbers drawing in a Keno-style game, and the like. A random number generator may be used to generate a random (luck-based) outcome in the host game. An outcome of a gambling event may include cards dealt to a player in poker game, the outcome of a slot pull, the outcome of a roulette spin, numbers drawn in a Keno-style game, and the like.

At 540, game elements are associated with a player based on the gambling event outcome. As discussed in detail below, game elements can include game items, characters, teams, landscapes in a game, and/or any other attribute of a particular guest game. Game elements may provide a player with a benefit or detriment in the guest game. Game elements may be associated with the outcome of the gambling event. For example, cards in poker-style game may be each associated with a game element. A player is dealt cards in round of the poker-style game, and the game elements associated with the cards may be associated with the player in the guest game. Similarly, reels of a slot style game may include game elements, and the player may be allocated game elements based on the outcome of a slot pull (e.g., the game elements shown where the reels come to rest).

At 550, a round of play in the guest game is initiated. The guest game may be initiated in a guest game server and/or system. A round of a play in a guest game may be initiated with one or more players allocated game elements from the host game. For example, a first player may have drawn an unlimited ammunition card in the host poker-style game and a second player may have drawn a grenade launcher card. Gameplay may be initiated in the guest shooter game with players each allocated their respective game elements from the host game.

At 560, an outcome of the guest game is determined. A gaming outcome may include whether the player wins the game, loses the game, achieves milestones in the game, finishes a level, and/or any other type of outcome resultant from the player's interaction with the guest game. The outcome may be dependent on the type of guest game. For example, gaming outcomes in a first person shooter may include a number of kills, a number of times the player dies, a number of points, and the like. Gaming outcomes could also include winning a race in racing game, winning or losing a fight in a fighting game, winning a hand in a card game, finishing a level in a game, and/or any other type of result of playing a game.

At 570, a player is allocated a portion of the wager. In various embodiments, a player is allocated a portion of their wager based on the outcome of the guest game. A portion of the wager can include none of the wager, a percentage of the wager, all of the wager, the player's wager plus other player's wagers (e.g., the entire pot), a payout based on odds associated with the guest game, and/or any other amount. In one example, if a player wins a round in a multiplayer game, that player may receive all of their wager plus other player's wagers, that is, the entire pot. In another example, a player who loses a multiplayer game may lose their entire wager, and that player would be allocated a portion of their wager equivalent to none of their wager.

At 580, it is determined whether additional rounds are to be played. In various embodiments, certain games may include multiple rounds of host and guest game play. For example, a poker-style host game overlayed on a first person shooter may include multiple rounds of betting (host game play) and first person shooter play. In certain cases, the wager from one round may carry over into a next round. If additional gameplay rounds remain, the process proceeds to step 510 and another host game round is initiated. If no additional gameplay rounds remain, the process ends. When the process ends a player may cash out, select another game, and/or perform other actions.

The Host Game

In various embodiments, players may select from a list of host game types, embodiments of these may be roulette, poker, dice games, slots, Keno-based games, and/or any casino gaming or gambling modality. Players may select minimum and maximum bet rooms according to their skill and budget, and can view the room details prior to joining the game, for example in a poker style game this may show information on the poker deck which relates to the game items that will be available in the guest game, the ante amount, round time length, and other information.

The game may be divided into a series of rounds; a round consists of the host game play part and a guest game action part. Players may be divided into teams or play individually against each other, or against the house (Bots). When players compete against the house "Bots" they are competing against computer controlled entities that have been specifically balanced to provide a prescribed level of return to the house that is in alignment with the regulatory requirements for the jurisdiction within which the casino or distributor operates. The "Bots" effectively replace the other humans in multiplayer games. The balancing result and therefore the odds are arrived at by quantitive analysis of the guest game under controlled conditions.

Each action round may last a set amount of time depending on the guest game type, for example a guest game may last up to five minutes. The round length may be configured by the administration tools. Players may be divided into teams or play individually against each other.

Each player may undertake the host game play before the action round. Example embodiments of host game play may include selection of cards in a poker style game, spinning the reels in a slots style game or spinning the wheel in a roulette style game. A gambling outcome of the host game play affects the action round in the guest game. A player may, for example, be associated with game elements during the host game. For example, a player may receive certain benefits depending on their luck and skill in the host gameplay. In certain cases, the host game integrates with a black box random number generator (RNG) for all random selection events. An embodiment of a black box RNG can be a managed RNG that has been tested and approved for use in gambling. Typical random events may be card dealing, team allocation, slot and roulette wheel outcome determination, Keno number draw, and/or any random (luck based) event.

In various embodiments, the host game triggers the action round in the guest game; the host may control the start and length of the action round. The host may use a special overlay to simultaneously display information in the guest game, and may display the following:

Time to the end of the action round
Team information (for team based play)
Total scores
Individual scores
Active buffs (derived from outcome of the host game rounds in poker, slots or roulette play).

The outcome of the guest game may be measured at the end of each round. The final round of the guest game concludes the host game, and the winner of the host game is evaluated.

Host Game with Poker Style Play

Figure 6:
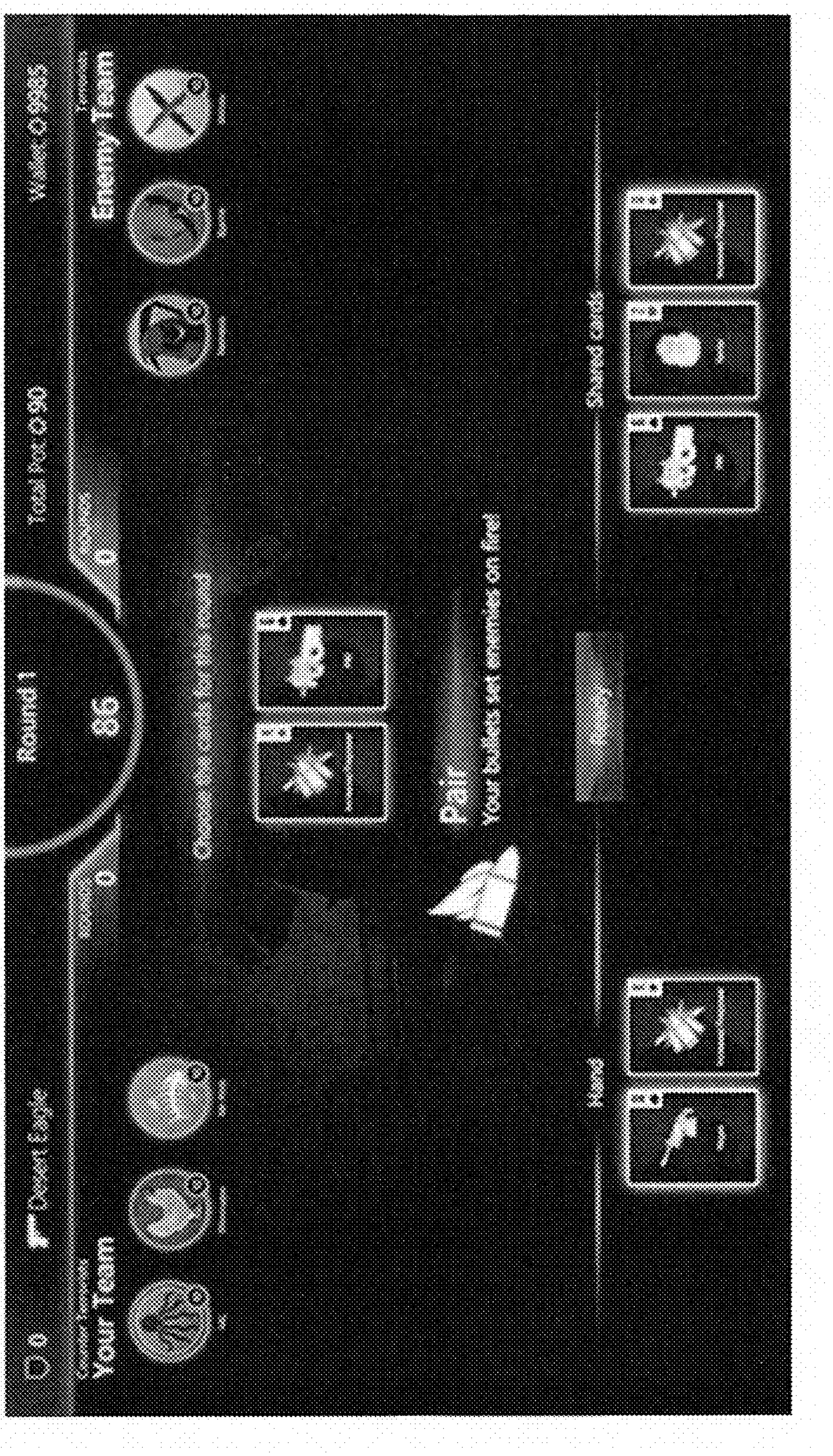
FIG. 6 is an interface illustrating embodiments of poker-style host game.

FIG. 6 is an interface illustrating embodiments of poker-style host game. In the example shown, a poker style host game 600 emulates Texas Hold 'Em poker. A player buys into the game, and can buy into each round with real money. The host game provides the player with selectable game elements (e.g., advantages) in the guest game. In certain cases, cards are allocated randomly and the player can choose when to use their advantages during the guest game. Each player may be unaware of other player advantages, or when they are playing them prior to the action round.

An embodiment of the host game is a game with a poker deck—with power up cards dealt to players at each round. The guest game may be a team based 1 vs. 1 or 1 vs. many, or 1 vs. Bots game play.

An example of the host round may begin with the player being dealt four (4) cards from which they can choose two, the actual quantities may be configured for each embodiment. In the case of a team match, the player may share a set of cards with the team. The player may then choose to match, fold, or raise the current bet. Once all players have made their wagers the player may then choose which cards to play in the action round from his own cards and the shared set.

In some embodiments, once cards are used they cannot be played again, but any bonuses that they may have created remain in force throughout all the rounds. In this embodiment, play continues in this manner for each round until the end of the match. In this embodiment, the winning team/player receives the lion's share of the pot, with a small percentage going to the best player—irrespective if they were on the winning team or not. The house/casino takes the rest which is typically a small percentage of the overall pot.

Action Rounds Design

Figure 7:
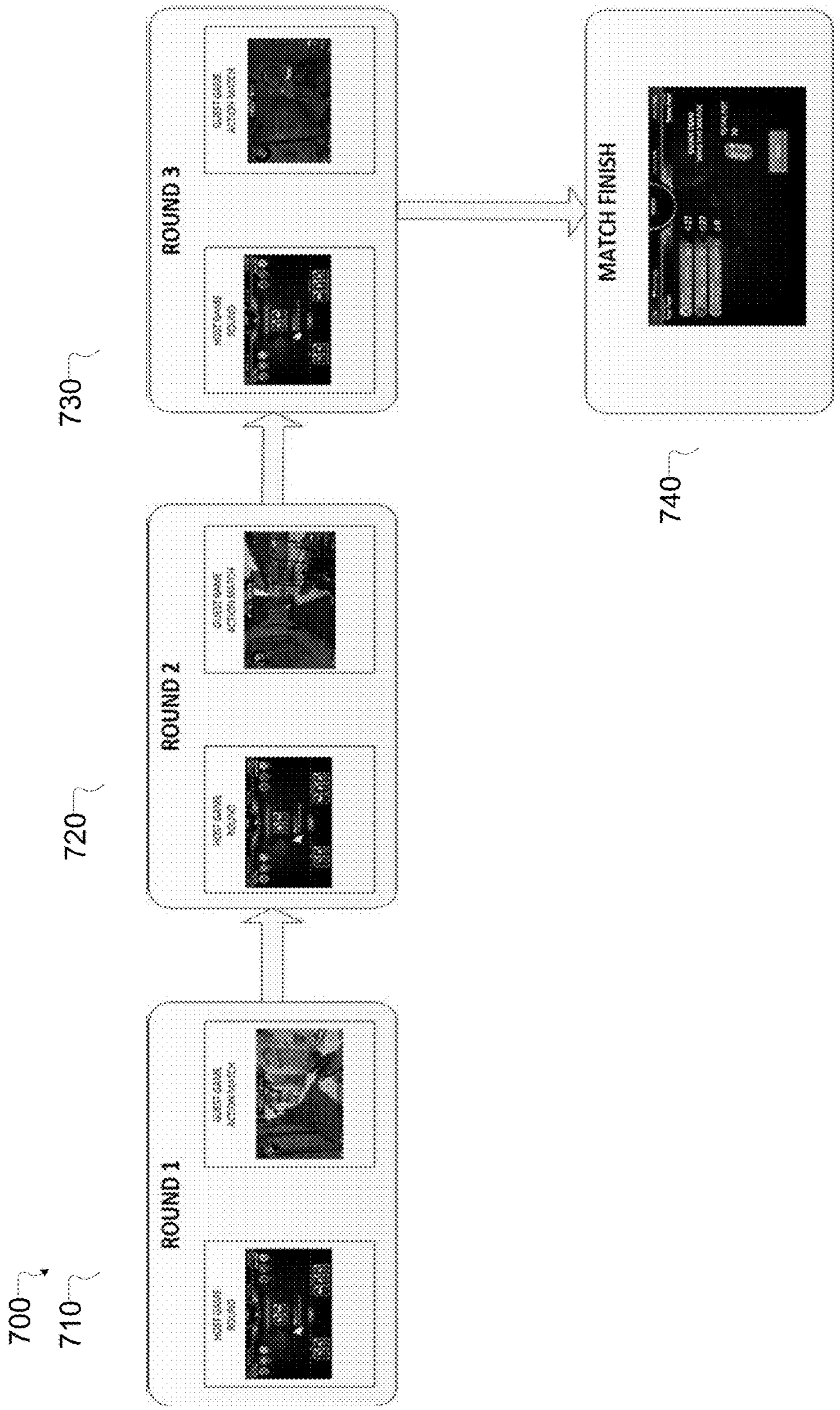
FIG. 7 is a diagram illustrating embodiments of match flow for a poker-style host game.

FIG. 7 is a diagram illustrating embodiments of match flow for a poker-style host game. In the example shown, a hybrid game 700 may include multiple rounds of gameplay. Each round may include custom designs. For example, each round may include a different variation on the game-play (e.g., different environment level, different setting, different constraints on players, etc.) In certain cases, each round includes a host game session (e.g., gambling game session) and guest game session. A first round 710 may include a poker-style host game session where wagers are placed and game elements (cards) are allocated. The host game session is followed by guest game play. The process is repeats for a second round 720, a third round 730, and/or other rounds. The match may be completed after the multiple rounds. In certain cases, wagers from rounds may carry over into subsequent rounds and game elements in a first round may affect elements in subsequent rounds.

Host Game with Slots Style Play

Figure 8:
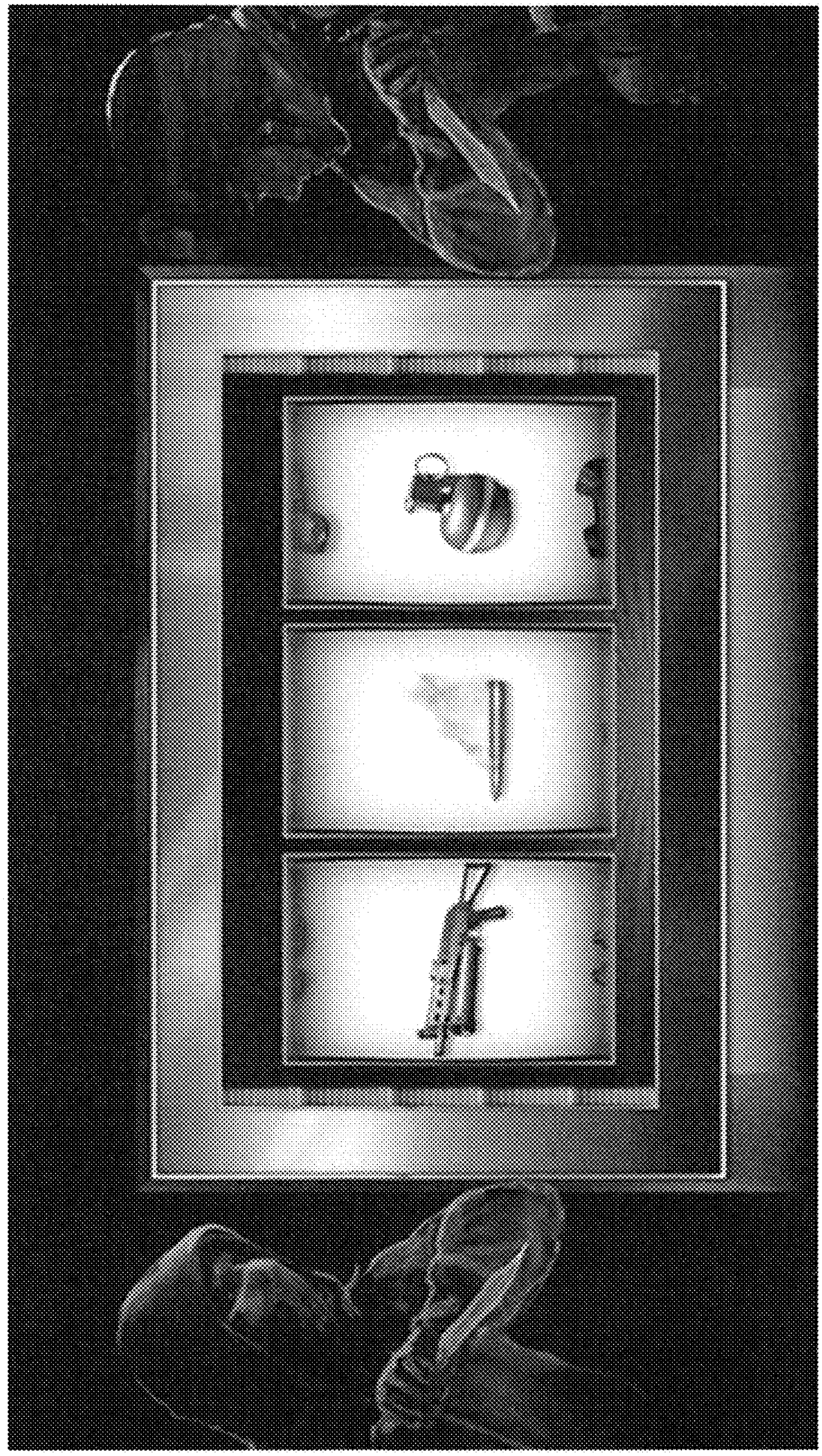
FIG. 8 is an interface illustrating embodiments of slots-style host game.
Figure 9:
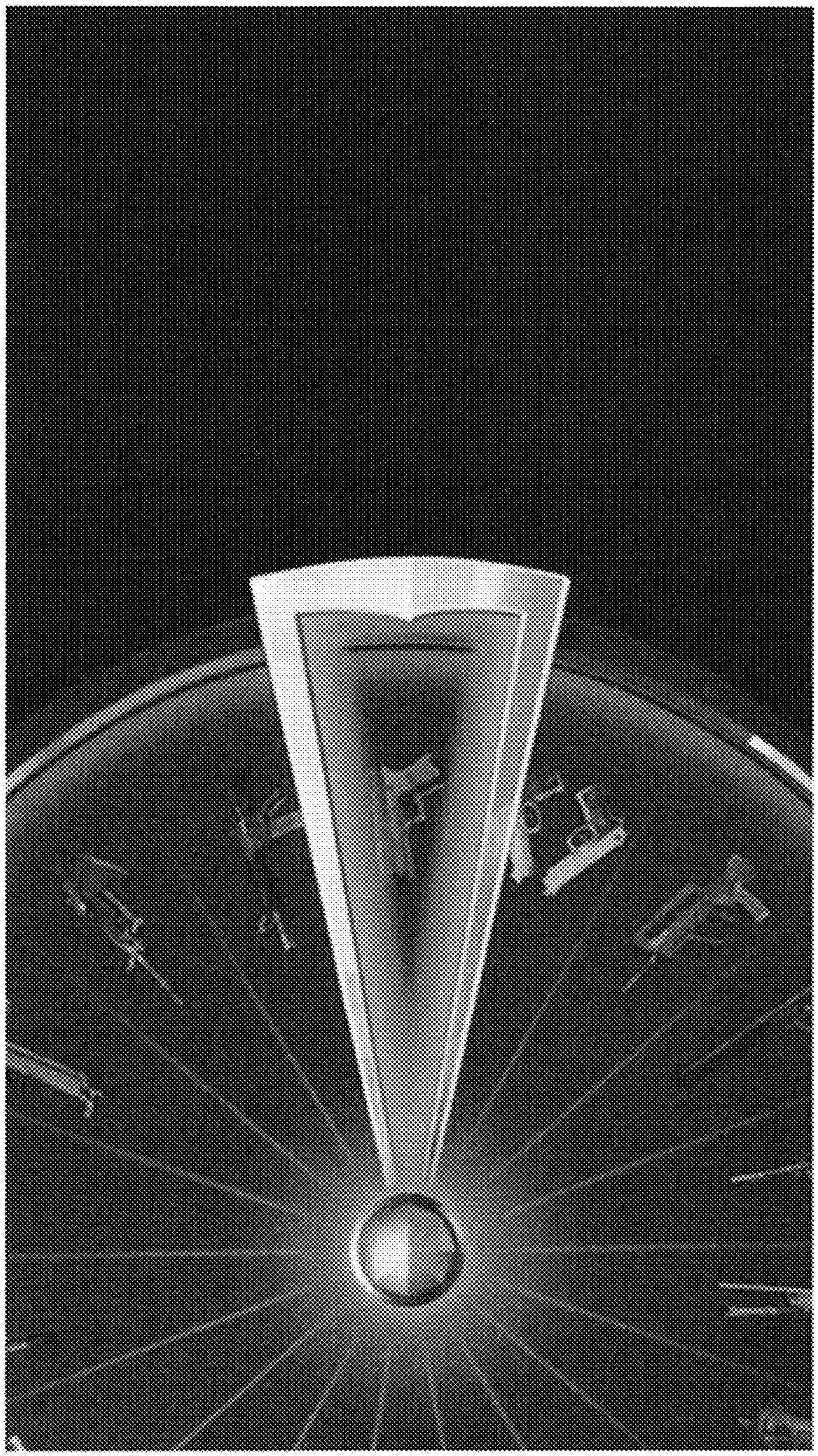
FIG. 9 is an interface illustrating embodiments of roulette-style host game.

FIG. 8 is an interface illustrating embodiments of slots-style host game. In the example shown, slots style host games 800 allow the player to pay into a slot game, and spin the reels on which a number of different game elements (e.g., benefits, game items, environments, characters, etc.) for the guest game are available. In certain cases, the combination of reels may select the player components for the action round in the guest game. In one embodiment, the player then plays a single action round against other players in the guest game, and the game concludes. The player may either win their wager back with profit, or receive nothing back. One example of this kind of host game is a tank game where the slots determine the type of tank and weapon and armor upgrades available to player An Example of a Host Game Roulette Style Play FIG. 9 is an interface illustrating embodiments of roulette-style host game. In the example shown, a roulette wheel host game 900 allocates game elements to players based on the outcome of the roulette wheel spin. In certain cases, a player may spin a roulette wheel to select a single Game Item for the action round. The action round plays out, and the game concludes. The player may either wins their wager back with profit, or receives nothing back.

One example of this kind of host game is a duel gunfight where the roulette spin determines what weapon the player gets.

In various embodiments, the system does not preclude other types of host game play that can be configured into single or multiple rounds.

The Guest Game and Game Model

In various embodiments, a guest game is integrated separately according to a game model. The game model may uniquely define how the guest game interacts with the host game.

A game model exists as a logical mapping of game elements, such as game item value in the guest game, to an "advantage" for each host game round. The game model determines the relative value of these game elements, including, for example, game items such as weapons, power-ups, power-downs to be used against other players. The relative value may be determined by analyzing the guest game during the integration phase.

Integrating a Guest Game

In various embodiments, a guest game is analyzed to determine the game elements that may be controlled by the host game, what kind of game it is, and how best to model it. A guest game may be any video game, such as a multi-player video game.

A first step may be to enumerate and categorize the game elements, such as the game environment, game items, and the like. This can be done in conjunction with the game provider or in isolation where a game has sufficient information and means of testing game variables.

Character/Player Controlled Element Types

In various embodiments, a game element may comprise a character. A "character" may include a representation of the player in the guest game, also referred to as an avatar. Examples might be a humanoid character, a vehicle, a plane or any controllable entity representing the player. Some guest games may have characters with varying base powers and abilities. These may be taken into account during the analysis and balancing phase of integration. Some host games may be utilized to determine which characters a player may receive in the guest game.

The different kinds of characters may have innate advantages depending on how they are played. An example of this is a fighting game such as Mortal Kombat where different characters have different abilities, and the skills come in mastering those abilities to the player advantage.

In-Game Game Items

In various embodiments, a game element may include a game item. These game items may be ranked based on potential performance enhancement, e.g., a rocket launcher is ranked far higher than a knife. A points system is used to describe the abilities of the game items that enhance or degrade the players' chances in a match.

- Weapons (ability to attack and disrupt other players)
- Attribute buffs (increases in speed, agility, health etc.)
- Equipment or armor (increases in resilience and abilities to withstand attack).

An example embodiment of game items in a first person shooter are:

- Player Speed Power Up—Adrenaline
- Enemy Slow Down—Stun Grenade
- Enemy Disarm—Weapon Jammer
- Enemy Marker—Marks hidden enemies for a few seconds
- Temporary Infinite Bullets
- Player Temporary Immunity—Adrenaline Rush
- Player Temporary Invisibility—hides player from enemy; and
- Player Temporary Awareness—shows all enemy on map Additionally weapons and equipment may be included in such an embodiment:

- Knife
- Crossbow
- Pistol
- Rifle
- Semi-automatic Rifle
- Submachine Gun
- Machine Gun
- Grenade Launcher
- Rocket Launcher
- Explosives Flak Jacket—reduced damage; and Body armour—more reduced damage, but slower movement Play Environment Types In various embodiments, game elements may include play environments. Play environments may include the arenas in which the guest game is played. The play environments may be directly related to the difficulty of the round of play, and give distinct advantages and disadvantages to player types. Careful selection of environments can be important, as too large environments can cause play to be unexciting as it is difficult to locate opponents. Too small environments can mean that play is too frantic.

In various embodiments, the following additional considerations may be evaluated in integrating a guest game:

a. Full control may be established over the game character abilities by the host system. Some multi-player video games progress character abilities as they play, these may be disabled to ensure symmetric fair play is maintained for each round.

b. The difficulty and learning curve for new players may be evaluated and optimized to facilitate players rapidly learning and having success playing the game.

c. The values that indicate a win or lose situation may be enumerated. This may be related to points scored, time played in the match, or some other metric.

d. The average "round" duration may be decided, and if the round duration is controllable determine the optimal length for the game. Many guest games will fall in a range of 1-5 minutes per round.

e. For games that have Bot characters controlled by the CPU—the behavior and abilities may be tuned to match the correct skill level of the players.

In various embodiments, when the initial analysis is complete, the next stage may be to perform controlled play to determine if the relative powers of characters and game elements (e.g., game items) need to be tuned. The results of this will further hone the scores and mapping of the game items. For example, in the embodiments that utilize poker as a host game we may design decks of cards grouped according to the category of game items, e.g. decks may be grouped into weapons, armor, abilities, and buffs.

Additionally, as in poker, combinations of cards may give extra benefits in the action round, for example two pair may boost the player's health.

Scoring the Game Element Benefits

In some embodiments, game elements may be divided across multiple rounds. Game items may for example be divided across N rounds; with them being selected at the relevant score level for the rounds. Scoring is done by careful analysis of the game item's use, and benefit.

In various embodiments, tests may be carried out with the game using a monte-carlo analysis. This may be embodied as an automated multiple-run process where the benefits are derived by quantitative and qualitative simulation of the game. This test is an important part of the process to give authoritive information on the actual benefit that an game item has to ensure complete fairness of the host game allocation, examples of analysis in an first person shooter (FPS) may include:

How long a boost lasts

What the effect of the boost is, in the FPS in terms of:

Likelihood of outright kill

Likelihood of identifying enemy positions

Likelihood of survivability for several test situations with the boost/Game Item active In some embodiments, the test process may also involve:

Controlled experimental environment where each game entity is under control of a real person, carrying out a series of scripted tests.

Comparison with similar game models and experiment.

Working directly with the original developer of the guest game.

An example embodiment for the first person shooter is scoring for boosts may be:

| Game Item/Boost | Score |
|---|---|
| Player Speed Power Up | 2 |
| Enemy Slow Down | 2 |
| Enemy Disarm | 4 |
| Enemy Marker | 5 |
| Temporary Infinite Bullets | 6 |
| Temporary Immunity | 7 |
| Temporary Invisibility | 10 |
| Temporary Awareness | 10 |

Game Items Allocation to Rounds

In some embodiments, the available power ups and game items are then allocated to rounds, an example embodiment of is for a first person shooter may be:

| Round | Game Item/Boost |
|---|---|
| 1 | Knife, Crossbow, Player Speed, Enemy Slow |
| 2 | Pistol, Rifle, Enemy Disarm, Enemy Marker |
| 3 | Semi-Automatic Rifle, Rocket Launcher, Temporary Immunity, Temporary Infinite Bullets |
| 4 | Machine Gun, Submachine Gun, Temporary Awareness, Temporary Invisibility |

Allocation may be based on game item level (as in the above example) or spread across rounds with a mix of game item levels available, or any other rule of distribution. Once the analysis is completed and relative measures of the benefit of each game item are calculated, the administrator may modify and rebalance the scoring of each game item as needed. The allocation of game items to rounds may also be controllable by the administrator, and can be edited in the administration system.

Physical Integration

A guest game may be physically connected to the host game by means of a compatible application programming interface (API), an existing modification (or MOD), a modified version of the game suitable for use with the system, and/or another interface. The system may require that the guest game be configured for each match with game items and power-ups for the player, that the game match flow is controlled by the host, and/or that information be delivered from the guest game regarding score and player behavior for analysis.

Registering and Hashing a Guest Game

In various embodiments, a numerical game hash may be created for the game using standard encoding techniques, such as MD4. The hash may be used to check that the game is uncorrupted and untampered with. The hash and game version may be stored in the database, which allows the host game system to query the hash at any point. Any update to server side software or client software must be registered with the system. Any attempt to connect a non-registered server, or non-registered client will fail and will raise a flag to a system administrator. Similarly, any data corruption, intentional or otherwise may also raise a flag and prevent the game terminal from playing.

Game Setup and Play

In some embodiments, when a game match is configured by the host game, the host game effectively takes control of the guest game by setting up the match, populating players and game elements and initiating host game rounds. Game rounds may have a time limit, a number of events (e.g., kills) limit, a round target (e.g., capture the flag), or any other controlling system for the round. The host game may also interrupt guest game flow to inject host game rounds, or if the game must be cancelled, or the number of players changes. The host game may also ensure the guest game clients feedback game data to the database for scoring and later analysis.

Player Analysis

In various embodiments, static player analysis may analyze player performance, and allocate rank to the player based on the outcomes and behaviors during games. Static player analysis may be carried out at the end of every match.

Players may be analyzed on key points of play according to the guest game type. An embodiment of player analysis in an FPS game this would typically be:

- Number of times a player appears in games.
- Average Daily, Monthly, Yearly Game rate
- Average, Median, Maximum, Minimum Minutes Played per session
- Average Median, Max, Min, Player Score
- Fastest Point Score Time (e.g., Kill)
- Fastest Death Time
- Longest Time Not killed
- Average, Median, Minimum, Maximum Buy-in All these values may be used to calculate the Player Rank and correctly match up the player with players of similar ability for each game.

Figure 10:
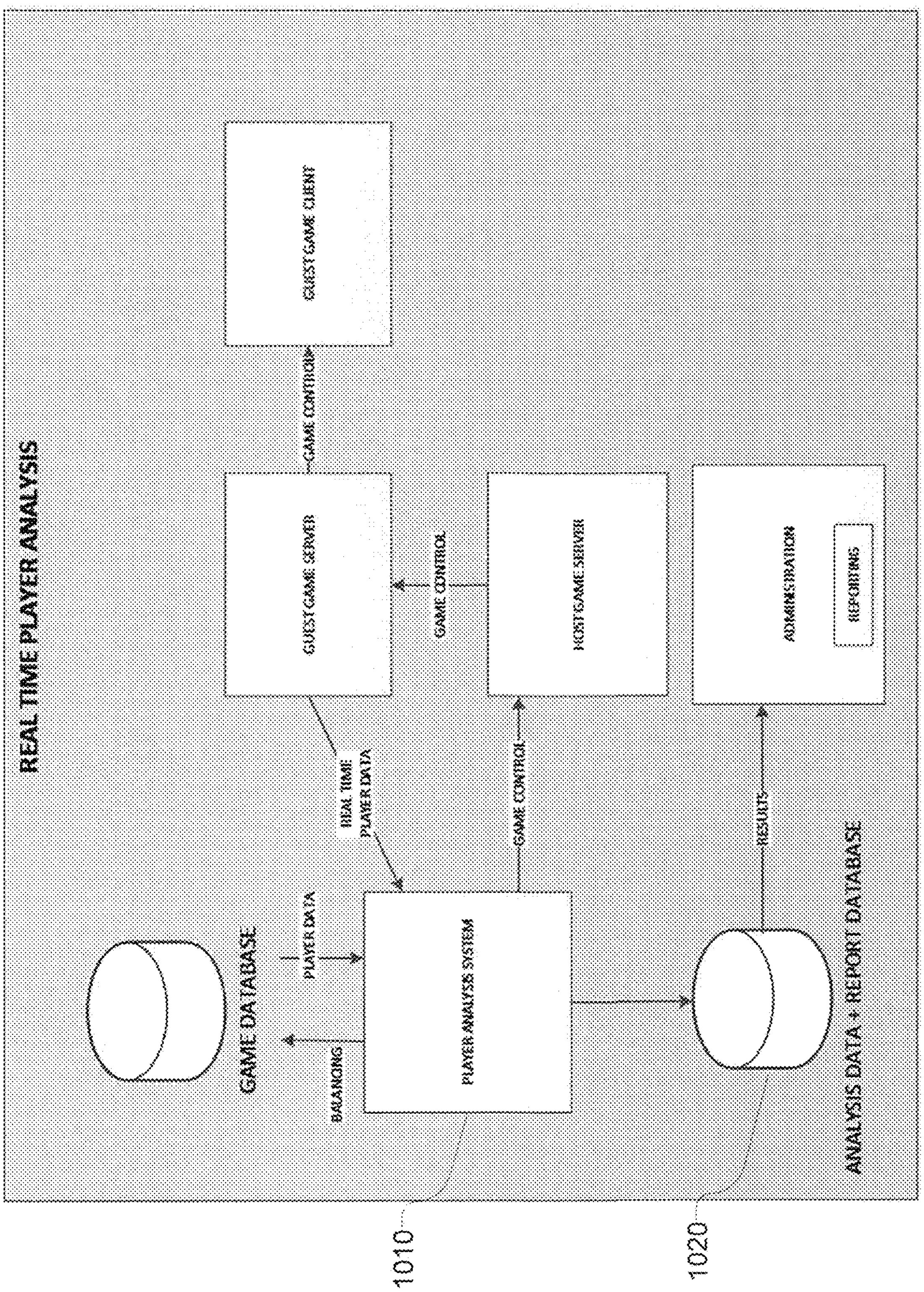
FIG. 10 is a block diagram illustrating embodiments of a system for real-time player analysis.

FIG. 10 is a block diagram illustrating embodiments of a system for real-time player analysis. In the example shown, a player analysis system 1010 interfaces with the game database, guest game server, and host game server. Real time player analysis may check player behavior in real-time for things that might indicate match fixing or deliberate "bad play" which affects the game for all players. The real time player analysis data may be stored in analysis data and report database 1020 for access by an administration server, e.g., associated with a casino.

An embodiment of real time player analysis may be by looking for unusual game play from the stream of data that comes from the server, some examples of this for an FPS may be:

- Staying in one spot for too long—camping
- Player deliberately continually killing themselves or tanking, by jumping into hazards, off buildings, etc., moving into enemy area with no cover.
- Player not playing to ability
- Player continually obstructing own team mates.

According to the offense, an embodiment of a real time player Analysis System make take the appropriate action from initiating warnings, temporary suspension from round, complete suspension from round, ban from game, and a ban from playing any games, i.e. complete account suspension. Such a system may be administered so that player grievances can be addressed at the desk using the reporting system. Continual "bad" play from any player may end in player account suspension. If further analysis indicates that they may have been involved in match fixing, the information and evidence can be passed to the relevant authorities. The data may be sent in snapshot packets for analysis in real-time. A snapshot packet is the summary of 30 seconds of play for each player. The data in the snapshot packet is related to the game type.

New Players

In various embodiments, when a new player joins the system, the system may not have enough information about the capability and performance of the player to be immediately allocated to a team of players of similar ability. One technique of dealing with this is by having qualifier play, whereby new players play the game for free, first so that they may understand the gameplay of the host game, and second so that the system can profile them. The new player plays a set number of games allowing the player to be profiled. Once a new player is profiled, they may be assigned a preliminary grade and rank, and then may join real games for real money.

The system gathers statistics for the player at the end of every match. In this way the player may ascend or descend the leaderboard rank naturally in the course of game play.

Methods of Team Allocation

Figure 11:
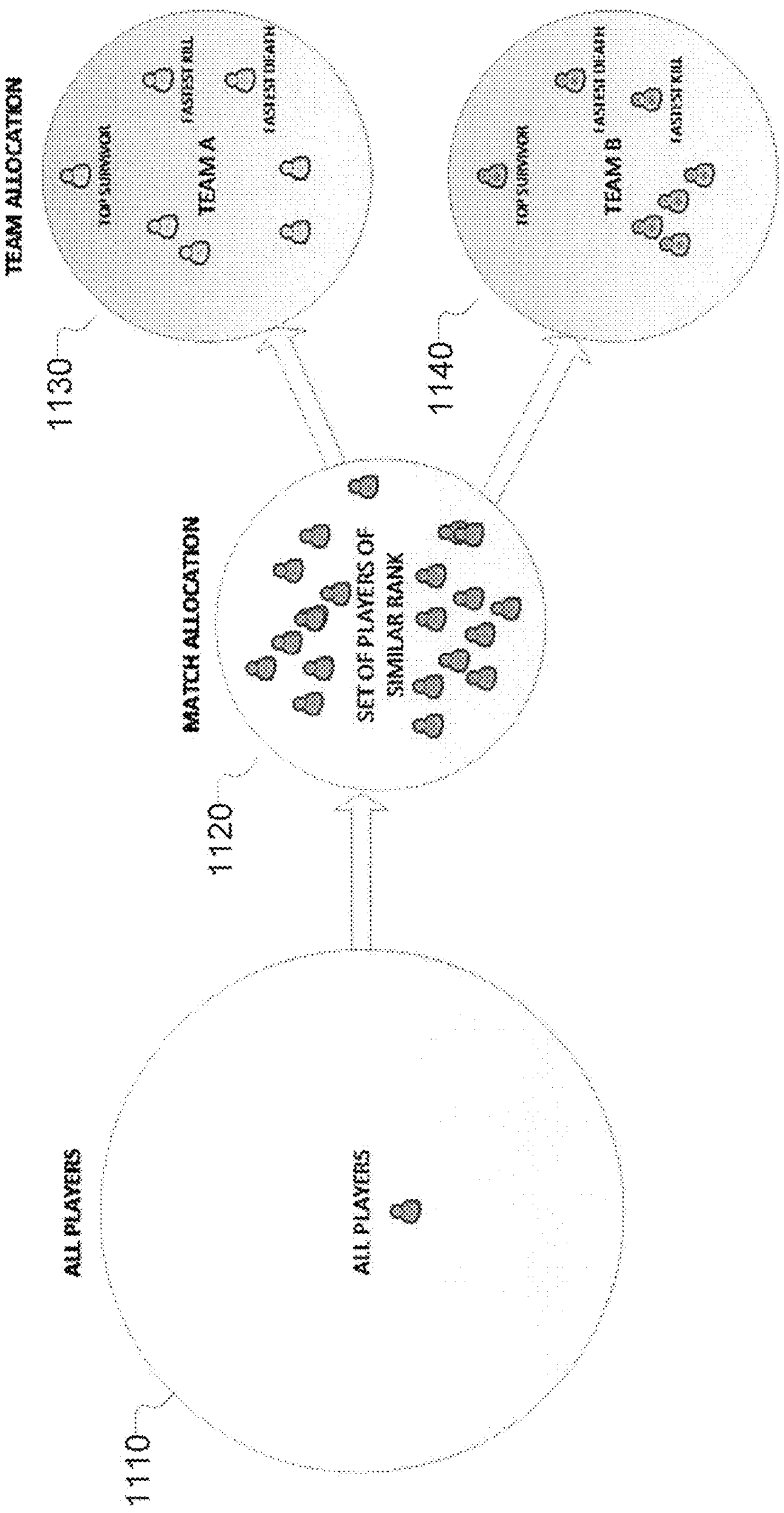
FIG. 11 is a diagram illustrating embodiments of match and team allocation process for players using rank and statistics.

FIG. 11 is a diagram illustrating embodiments of match and team allocation process for players using rank and statistics. In various embodiments, players may be allocated to teams based on their rank and statistics gathered from previous play. A team may simply be a balanced team, such that players in the team will have similar overall rank or score which is self-evident. Players may be selected from a pool of all players 1110. For example, a set of players 1120 of similar rank, skill, or other attributes are selected for a match. From the set of players 1120, the players may be divided into a first team 1130 and a second team 1140.

In certain cases, a more granular approach may be undertaken by evaluating players on play style in addition to ability. An embodiment of evaluating granular play style and distributing players may be as follows:

Players are randomly allocated from a pool of all players 1110 to the teams 1130, 1140 based on a distribution of information, for example on a given team, by further subcategorizing the player:

- Player 1—Top Longest Time Not Killed
- Player 2—Top Fastest Point Score Time
- Player 3—Top Score
- Player 4—Top Game Play Rate/Frequency
- Player 5—Fastest Death Time Both teams may use the same criteria for selecting players from the pool of possible players, but may not necessarily arrange the players in the same order of statistic, e.g., Player 1 will not always be the "Top Longest Time Not Killed" from the pool of players; this might be allocated to be Player 5, or any other player slot.

Anti-Match Fixing Methods

An embodiment of the system may take preventative measures against match fixing and collusion using the following methods:

- At new player stage—players may be assessed in qualifier play, and checked for deviation from the expected behavior.
- At team selection stage—players may be randomly selected; this makes it difficult to predict which team any given combinations of players will end up on.
- In game stage in real time—player behavior may be monitored for unusual "Tanking" of the match.
- Post-match stage—player statistics may be collected and compared with expected performance, and checked to be within expected values. Again any large deviation may cause the match to be cancelled, all funds returned and the player investigated.

In addition player behavior and play patterns are cross-correlated across all the different games they play, to get an overall picture of the abilities of the player.

The systems and methods disclosed herein may include the following example embodiments:

A method of integrating multi-player (Guest) computer games into an over-arching host game for the purposes of player wager and reward via the host game. A system computer UI framework by which a guest game is overlaid with a host game, and whereby the host game environment software can control, and receive information from the guest game. A player ranking/match method that assesses the rank and performance of players, and matches players across multiple guest games. This includes a method of introducing new players with unknown abilities to the game via game qualifier assessment. A method of assessing benefit of game Items using qualitative and quantitative approaches. A staged method of assessing match fixing behavior in players across multiple game types in offline analysis. A method of real-time player behavior analysis to check for unusual behavior leading to match fixing. A method of player distribution in a new game based on rank, and individual player statistic.

A method of video game competition wagering, comprising assigning a plurality of players to a round of play in a host game, wherein the host game includes a video game configured for use in a wagering platform by altering the code of the video game to allow items in the game to be distributed to the players; allocating a set of the items amongst the players; receiving wager information for each of the players; and providing at least one of the players an award based on the wager information and an outcome of the round of play. The video game may be configured for use in the wagering platform by modifying the video game to be controlled by components of the wagering platform and to provide information to the wagering platform.

A computer-implemented system for video game competition wagering, the system comprising: a processor; and a memory coupled with the processor, wherein the memory is configured to provide the processor with instructions which when executed cause the processor to: assign a plurality of players to a round of play in a host game, wherein the host game includes a video game configured for use in a wagering platform, at least in part, by allowing items in the game to be distributed amongst the players; allocate a set of the items amongst the players; receive wager information from the players; and provide at least one of the players an award based on the wager information and an outcome of the round of play.

One or more tangible non-transitory computer-readable storage media for storing computer-executable instructions executable by processing logic, the media storing one or more instructions to: assign a plurality of players to a round of play in a host game, wherein the host game includes a video game configured for use in a wagering platform, at least in part, by allowing items in the game to be distributed amongst the players; allocate a set of the items amongst the players; receive wager information from the players; and provide at least one of the players an award based on the wager information and an outcome of the round of play.

Figure 12:
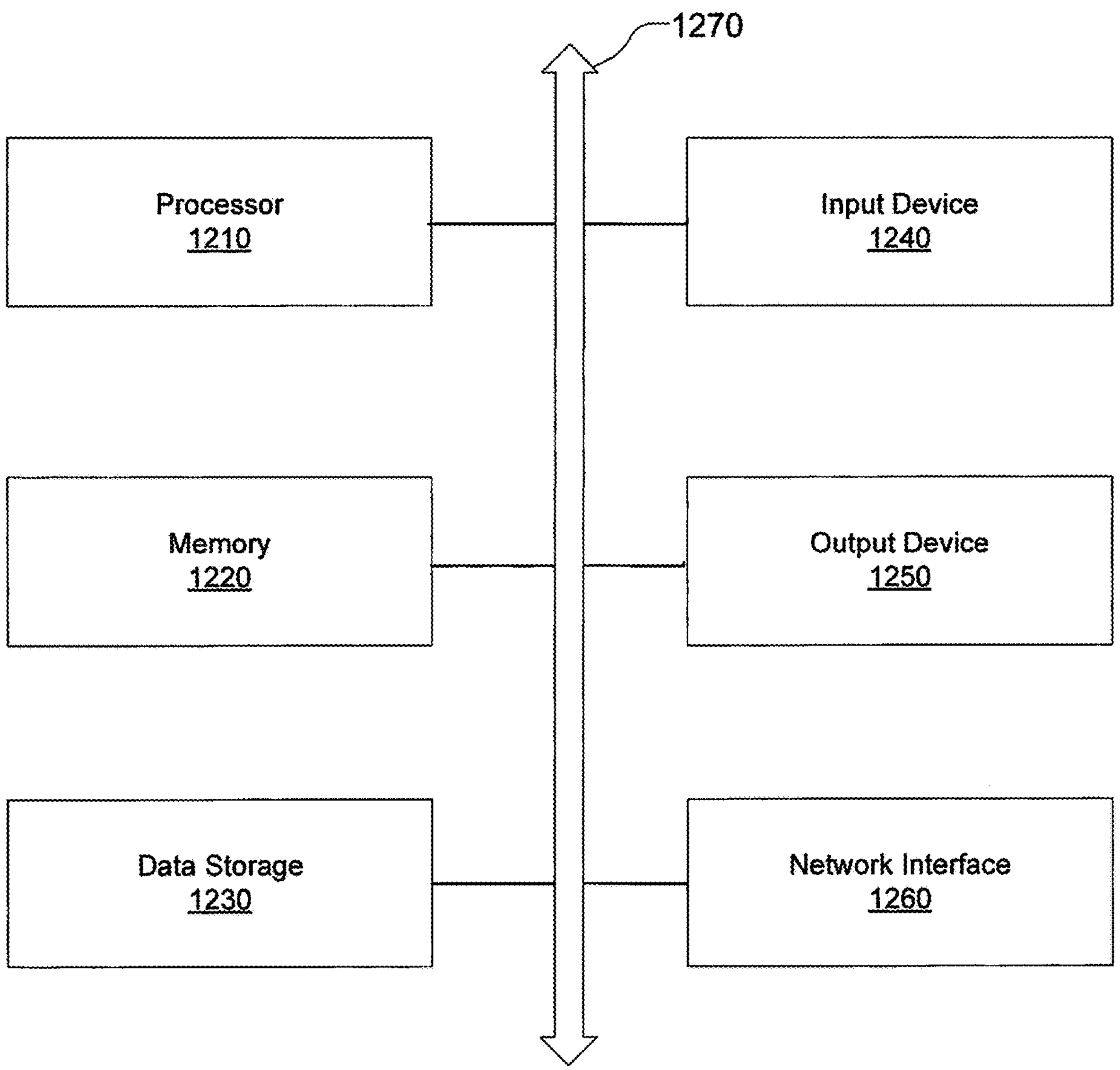
FIG. 12 depicts an example computing system according to various embodiments.

FIG. 12 illustrates an example computer system 1200 which can be used to perform the methods for delivering purchase recommendations according to one embodiment as disclosed herein. Computer system 1200 can be an instance of a host game system, guest game system, casino system, and/or any other computing systems contemplated by the present disclosure. With reference to FIG. 12, computing system 1200 includes one or more processors 1210, one or more memories 1220, one or more data storages 1230, one or more input devices 1240, one or more output devices 1250, network interface 1260, one or more optional peripheral devices, and a communication bus 1270 for operatively interconnecting the above-listed elements. Processors 1210 can be configured to implement functionality and/or process instructions for execution within computing system 1200. For example, processors 1210 may process instructions stored in memory 1220 or instructions stored on data storage 1230. Such instructions may include components of an operating system or software applications necessary to implement the methods for video game competition wagering as described above.

Memory 1220 can be configured to store information within computing system 1200 during operation. For example, memory 1220 can store instructions to perform the methods for delivering purchase recommendations as described herein. Memory 1220, in some example embodiments, may refer to a non-transitory computer-readable storage medium or a computer-readable storage device. In some examples, memory 1220 is a temporary memory, meaning that a primary purpose of memory 1220 may not be long-term storage. Memory 1220 may also refer to a volatile memory, meaning that memory 1220 does not maintain stored contents when memory 1220 is not receiving power. Examples of volatile memories include RAM, dynamic random access memories (DRAM), static random access memories (SRAM), and other forms of volatile memories known in the art. In some examples, memory 1220 is used to store program instructions for execution by processors 1210. Memory 1220, in one example, is used by software applications or mobile applications. Generally, software or mobile applications refer to software applications suitable for implementing at least some operations of the methods as described herein.

Data storage 1230 can also include one or more transitory or non-transitory computer-readable storage media or computer-readable storage devices. For example, data storage 1230 can store instructions for processor 1210 to implement the methods described herein. In some embodiments, data storage 1230 may be configured to store greater amounts of information than memory 1220. Data storage 1230 may be also configured for long-term storage of information. In some examples, data storage 1230 includes non-volatile storage elements. Examples of such non-volatile storage elements include magnetic hard discs, optical discs, solid-state discs, flash memories, forms of electrically programmable memories (EPROM) or electrically erasable and programmable memories, and other forms of non-volatile memories known in the art.

Computing system 1200 may also include one or more input devices 1240. Input devices 1240 may be configured to receive input from a user through tactile, audio, video, or biometric channels. Examples of input devices 1240 may include a keyboard, keypad, mouse, trackball, touchscreen, touchpad, microphone, video camera, image sensor, fingerprint sensor, scanner, or any other device capable of detecting an input from a user or other source, and relaying the input to computing system 1200 or components thereof.

Output devices 1250 may be configured to provide output to a user through visual or auditory channels. Output devices 1250 may include a video graphics adapter card, display, such as liquid crystal display (LCD) monitor, light emitting diode (LED) monitor, or organic LED monitor, sound card, speaker, lighting device, projector, or any other device capable of generating output that may be intelligible to a user. Output devices 1250 may also include a touchscreen, presence-sensitive display, or other input/output capable displays known in the art.

Computing system 1200 can also include network interface 1260. Network interface 1260 can be utilized to communicate with external devices via one or more communications networks such as a communications network or any other wired, wireless, or optical networks. Network interface 1260 may be a network interface card, such as an Ethernet card, an optical transceiver, a radio frequency transceiver, or any other type of device that can send and receive information.

An operating system of computing system 1200 may control one or more functionalities of computing system 1200 or components thereof. For example, the operating system may interact with the software or mobile applications and may facilitate one or more interactions between the software/mobile applications and processors 1210, memory 1220, data storages 1230, input devices 1240, output devices 1250, and network interface 1260. The operating system may interact with or be otherwise coupled to software applications or components thereof. In some embodiments, software applications may be included in the operating system.

Present teachings may be implemented using a variety of technologies, including computer software, electronic hardware, or a combination thereof, depending on the application. Electronic hardware can refer to a processing system, such as a computer, workstation or server that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. The term "processor" is intended to include systems that have a plurality of processors that can operate in parallel, serially, or as a combination of both, irrespective of whether they are located within the same physical localized machine or distributed over a network. A network can refer to a local area network (LAN), a wide area network (WAN), and/or the Internet. One or more processors in the processing system may execute software, firmware, or middleware (collectively referred to as "software"). The term "software" shall be construed broadly to mean instructions, instruction sets, code, code segments, program code, programs, subprograms, software components, applications, software applications, mobile applications, software packages, routines, subroutines, objects, executables, threads of execution, procedures, functions, etc., whether referred to as software, firmware, middleware, microcode, hardware description language, and the like. If the embodiments of this disclosure are implemented in software, it may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

What is claimed is:

1. A method of video game competition wagering in a hybrid game including a host game and a guest game, the method comprising:

initiating, at a host game server, the host game including a gambling modality;

determining, at the host game server, an outcome of the host game for a player in the host game, wherein one or more game elements of the guest game are associated with the outcome of the host game, the one or more game elements including a benefit in the guest game if the outcome of the host game is positive or a detriment in the guest game if the outcome of the host game is negative, wherein one or more of the benefit and the detriment are relative to at least one other player in the guest game;

based at least in part on the outcome of the host game, associating, at the host game server, the one or more game elements of the guest game with the player;

when the one or more game elements of the guest game have been associated with the player, receiving, at the host game server, a wager associated with the player in the host game;

causing, by the host game server via communication to at least one guest game server, initiation of a round of game play in the guest game on one or more guest game devices, wherein the guest game includes an interactive video game and the one or more game elements from the host game affect the player's interaction in the round of game play of the guest game, wherein the player is provided the benefit associated with the one or more game elements in the guest game if the outcome of the host game is positive or the detriment associated with the one or more game elements in the guest game if the outcome of the host game is negative, and the at least one guest game server determines a gaming outcome of the guest game based at least in part on the player's interaction with the round of game play in the guest game;

receiving, at the host game server via communication with the at least one guest game server, the gaming outcome of the guest game from the at least one guest game server; and determining, at the host game server, an outcome of the wager based on the gaming outcome of the guest game.

2. The method of claim 1, further comprising allocating, at the host game server, at least a portion of the wager to the player based at least in part on the outcome of the wager.

3. The method of claim 1, wherein the gambling modality comprises one or more of a poker-based game, a roulette-based game, a slot-based game, a Keno-based game, a card-based gambling game, and a dice-based game.

4. The method of claim 1, wherein the guest game comprises a multi-player video game configured for use in the hybrid game.

5. The method of claim 4, wherein the multi-player video game is configured for use in the hybrid game by one or more of:

wrapping the multi-player video game;

interfacing with the multi-player video game using a software development kit (SDK);

interfacing with the multi-player video game using an application program interface; and modifying at least a portion of code associated with the multi-player video game.

6. The method of claim 1, wherein the guest game is controlled by the host game.

7. The method of claim 6, wherein the host game initiates the round of game play in the guest game, the round of game play is configured to provide the player an advantage of game elements derived from the host game.

8. The method of claim 1, wherein the one or more game elements provide a benefit or a detriment affecting the player's performance in the guest game.

9. The method of claim 1, wherein the host game initiates the round of game play in the guest game.

10. The method of claim 1, further comprising causing, by the host game server via communication to the at least one guest game server, initiation of a plurality of rounds of game play in the guest game on the one or more guest game devices.

11. The method of claim 10, wherein each of the rounds of game play include a different variation of the guest game.

12. The method of claim 11, further comprising allocating, at the host game server, different game elements to the player in each round of game play, the different game elements each associated with the outcome of the host game preceding the round of game play.

13. The method of claim 1, further comprising:

analyzing, by the host game server, a behavior of the player during the round of game play;

determining, by the host game server, based at least in part on the analysis that a player is engaged in unusual activity; and initiating, by the host game server, a remediation action based at least in part on the determination.

14. The method of claim 1, the benefit associated with the game elements provides the player an advantage over the other player in the guest game.

15. The method of claim 14, wherein the benefit associated with the game elements includes one or more of an improved weapon, an improved defense, and improved gameplay capabilities relative to the other player in the guest game.

16. The method of claim 1, the detriment associated with the game elements situates the player at a disadvantage relative to the other player in the guest game.

17. The method of claim 16, wherein the detriment associated with the game elements includes one or more of the player not receiving an improved weapon, an improved defense, and improved gameplay capabilities relative to the other player in the guest game.

18. The method of claim 1, further comprising receiving, at the host game server, a selection of the host game from a plurality of host games.

19. The method of claim 1, further comprising causing, by the host game server via communication to the at least one guest game server, initiation of a round of the hybrid game, wherein the round of the hybrid game includes a host game session and a guest game session.

20. The method of claim 19, further comprising performing, at the host game server, the host game session prior to the guest game session.

21. The method of claim 1, further comprising providing, by the host game server via communication with the one or more guest game devices, the host game and the guest game to the one or more guest game devices such that one or more players interact with the host game and the guest game on the one or more guest game deices.

22. The method of claim 21, further comprising controlling, by the host game server via communication with the one or more guest game devices, the guest game on the one or more guest game devices to provide the one or more game elements to the player based on the outcome of the host game.

23. The method of claim 1, further comprising presenting, by the host game server via communication with the one or more guest game devices, a host game interface on the one or more guest game devices, the host game interface including an interface of the host game and the guest game.

24. A computer-implemented system for video game competition wagering in a hybrid game comprising a host game and a guest game, the system comprising:

a host game server, at least one guest game server, and one or more guest game devices, the host game server configured to:

initiate the host game, the host game including a gambling modality;

determine an outcome of the host game for a player in the host game, wherein one or more game elements for the guest game are associated with the outcome of the host game, the one or more game elements including a benefit in the guest game if the outcome of the host game is positive or a detriment in the guest game if the outcome of the host game is negative, wherein one or more of the benefit and the detriment are relative to at least one other player in the guest game;

based at least in part on the outcome of the host game, associate the one or more game elements for the guest game with the player in the guest; and when the one or more game elements for the guest game have been associated with the player, receive a wager associated with the player in the host game;

cause, via communication with the at least one guest game server, initiation of a round of game play in the guest game on the one or more guest game devices, wherein the guest game includes an interactive video game;

the guest game server configured to:

receive information identifying the one or more game elements and the player, wherein the one or more game elements from the host game affect the player's interaction in the round of game play of the guest game;

during the round of game play in the guest game, provide the player the benefit associated with the one or more game elements in the guest game if the outcome of the host game is positive or the detriment associated with the game elements in the guest game if the outcome of the host game is negative;

determine a gaming outcome of the guest game based at least in part on the player's interaction with the round of game play in the guest game;

provide, via communication with the host game server, the gaming outcome of the guest game to the host game server; and the host game server further configured to:

receive, via communication with the at least one guest game server, the gaming outcome of the guest game from the at least guest game server; and determine an outcome of the wager based on the gaming outcome of the guest game.

25. The system of claim 24, further comprising a casino system that controls at least one aspect of the host game.

26. The system of claim 24, wherein the host game server is configured to allocate a portion of the wager to the player based at least in part on the outcome of the wager.

27. The system of claim 24, wherein the host game server is configured to:

initiate multiple rounds of game play in the guest game; and allocate different game elements in each round of game play, the different game elements each associated with the outcome of the host game preceding the round of game play.

28. The system of claim 24, further comprising a player analysis configured to:

analyze a behavior of the player during the round of game play;

determine based at least in part on the analysis that the player is engaged in unusual activity; and initiate a remediation action based at least in part on the determination.

29. One or more tangible non-transitory computer-readable storage media for storing computer-executable instructions executable by processing logic, the one or more tangible non-transitory computer-readable storage media storing one or more instructions to:

initiate, at a host game server, a host game of a hybrid game including the host game and a guest game, the host game including a gambling modality;

determine, at the host game server, an outcome of the host game for a player in the host game, wherein one or more game elements for the guest game are associated with the outcome of the host game, the one or more game elements including a benefit in the guest game if the outcome of the host game is positive or a detriment in the guest game if the outcome of the host game is negative, wherein one or more of the benefit and the detriment are relative to at least one other player in the guest game;

based at least in part on the outcome of the host game, associate, at the host game server, the one or more game elements for the guest game with the player in the guest game;

when the one or more game elements for the guest game have been associated with the player, receive, at the host game server, a wager associated with the player in the host game;

cause, by the host game server via communication with at least one guest game server, initiation of a round of game play in the guest game on one or more guest game devices, wherein the guest game includes an interactive video game and the one or more game elements from the host game affect the player's interaction in the round of game play of the guest game, wherein the player is provided the benefit associated with the one or more game elements in the guest game if the outcome of the host game is positive or the detriment associated with the one or more game elements in the guest game if the outcome of the host game is negative, and the at least one guest game server determines a gaming outcome of the guest game based at least in part on the player's interaction with the round of game play in the guest game;

receive, at the host game server via communication with the at least one guest game server, the gaming outcome of the guest game from the at least one guest game server; and determine, at the host game server, an outcome of the wager based on the gaming outcome of the guest game.

30. The one or more tangible non-transitory computer-readable storage media of claim 29, wherein the one or more tangible non-transitory computer-readable storage media stores one or more instructions to allocate, at the host game server, a portion of the wager to the player based at least in part on the outcome of the wager.

31. The one or more tangible non-transitory computer-readable storage media of claim 29, wherein the gambling modality comprises one or more of a poker-based game, a roulette-based game, a Keno-based, a slot-based game, a card-based gambling game, and a dice-based game.

32. The one or more tangible non-transitory computer-readable storage media of claim 29, wherein the guest game comprises one or more of a video game and a multiplayer video game configured for use in the hybrid game.

33. The one or more tangible non-transitory computer-readable storage media of claim 29, wherein the one or more tangible non-transitory computer-readable storage media stores one or more instructions to:

analyze, by the host game server, a behavior of the player during the round of game play;

determine, at the host game server, based at least in part on the analysis that the player is engaged in unusual activity; and initiate, at the host game server, a remediation action based at least in part on the determination.

* * * * *